United States Patent
Kaburagi et al.

(10) Patent No.: US 7,110,128 B1
(45) Date of Patent: Sep. 19, 2006

(54) CONTROLLING DOT CONNECTIVITY IN BINARIZING AN IMAGE

(75) Inventors: Hiroshi Kaburagi, Kanagawa-ken (JP); Seita Shono, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 09/678,297

(22) Filed: Oct. 3, 2000

(30) Foreign Application Priority Data

Oct. 7, 1999 (JP) .................................. 11-287128

(51) Int. Cl.
G06F 15/00 (2006.01)
(52) U.S. Cl. ...................... 358/1.15; 358/1.9; 358/3.01
(58) Field of Classification Search .................. 358/1.9, 358/1.15, 1.1, 1.11–1.14, 1.16, 1.18, 512, 358/518, 501; 382/172, 466, 50–51
See application file for complete search history.

(56) References Cited

U.S. PATENT DOCUMENTS

| 5,121,446 | A | | 6/1992 | Yamada et al. | ................ 382/50 |
| 5,166,986 | A | * | 11/1992 | Mizuoka et al. | ............. 382/172 |
| 5,325,448 | A | | 6/1994 | Katayama et al. | ............. 382/50 |
| 5,577,136 | A | | 11/1996 | Tanioka et al. | ............. 382/270 |
| 5,696,853 | A | * | 12/1997 | Kawana et al. | ............. 382/299 |
| 5,777,759 | A | | 7/1998 | Kaburagi et al. | ........... 358/536 |
| 5,825,940 | A | | 10/1998 | Yamagata et al. | ........... 382/276 |
| 5,854,882 | A | * | 12/1998 | Wang | .......................... 358/1.9 |
| 6,031,627 | A | * | 2/2000 | Kakutani | ..................... 358/1.9 |
| 6,538,762 | B1 | * | 3/2003 | Terashima et al. | ......... 358/1.15 |

OTHER PUBLICATIONS

U.S. Appl. No. 09/318,600, filed May 26, 1999.
U.S. Appl. No. 09/210,549, filed Dec. 14, 1998.
R.W. Floyd and L. Steinberg, "An Adaptive Algorithm for Spatial Grey Scale", SID Int. Sym. Digest of Tech. Papers, p. 36-37 (1975).

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

Communication with an external image output device is established via a network interface, information concerning the characteristics of the image output devices is received and is held in a back-up RAM. A multilevel image containing gray-scale information enters from an input sensor pixel by pixel and is binarized to a binary image by a binarization circuit. At this time the connectivity of the binary image is controlled based upon the characteristic information held in the RAM and the binary image, the connectivity of which has been controlled, is transmitted to the external image output device via the network interface. As a result, the connectivity of the binary image is controlled to deal with a change in binary-image reproducibility caused by differences in engine characteristics of image output devices on a network and by changes in the environment and change with time, thereby making it possible to optimize connectivity, achieve stable reproduction and improve image quality.

8 Claims, 22 Drawing Sheets

```
if( DR≦LR1){
    ‖ = 0;
}
else if( LR1<DR && DR≦LR2 ){
 ‖ =( (DR-LR1) * (ALF * 256/(LR2-LR1)) )/256;
}
else if( LR2<DR && DR≦LR3 ){
 ‖ =ALF;
}
else if( LR3<DR && DR≦LR4 ){
 ‖ =ALF-( (DR-LR3) * (ALF * 256/(LR4-LR3)) )/256;
}
else{
    ‖ =0;
}
T= ‖ -ALFm
```

※ SETTINGS BY CPU

LR1 : CONSTANT(16)
LR2 : CONSTANT(48)
LR3 : CONSTANT(223)
LR4 : CONSTANT(225)

※ INPUT FROM BACK-UP RAM 211

ALF : CONSTANT(32)
ALFm : CONSTANT(16)

ONE PIXEL

ERROR (DATA) OF UP TO FOUR BITS (±7) CAN BE STORED BY USING MEMORY, IN WHICH ONE PIXEL IS REPRESENTED BY TWO BITS (±1), TWO PIXELS AT A TIME

PIXEL OF INTEREST

PIXEL OF INTEREST

PIXEL OF INTEREST

if(B32==0 && B22==1 && B12==0 && B21==0 && B11==1 && B01==0 ){
    S'=15;
}
else if(Bi12==0 && Bi22==1 && Bi32==0 && B01==0 && Bi11==1 && Bi21==0){
    S'=15;
}
else if(B12==0 && B02==0 && Bi12==0 && Bi22==0 && Bi32==0
        && B11==0 && B01==0 && Bi11==1 && Bli21==0 && Bi31==0 && B20==0){
    if(D<31){S'=15; }
    else{    S'=0; }
}
else if(B32==0 && B22==0 && B12==0 && B02==0 && Bi12==0
        && B31==0 && B21==0 && B11==1 && B01==0 && Bi11==0 && B20==0){
    if(D<31){S'=15; }
    else{    S'=0; }
}
else if(B02==0 && Bi12==0 && B11==0 && B01==1 && Bi11==1 && Bi21==0 && B20==0){
    S'=-A;
}
else if(B02==0 || Bi12==0) && B11==0 && B01==1 && Bi11==1 && Bi21==0){
    S'=-B;
}
else if(B12==0 && B02==0 && B21==0 && B11==1 && B01==1 && Bi11==0 && B20==0){
    S'=-A;
}
else if(B12==0 || B02==0) && B21==0 && B11==1 && B01==1 && Bi11==0){
    S'=-B;
}
else if(B12==0 && B02==0 && B21==0 && Bi11==0 && Bi21==0 && B20==0){
    S'=-A;
}
else if(B12==0 && B02==1 && Bi12==0 && B21==0 && B11==1 && B01==0){
    S'=-B;
}
else{
    S'=0;
}
```

※
LT1 : CONSTANT(2)
LT2 : CONSTANT(4)
LT3 : CONSTANT(8)
LT4 : CONSTANT(16)

PIXEL OF INTEREST

```
if(D≦N1){
  P1=RD/SL;
}
else if( (N1<D) && (D≦N2) ){
  P1=(RD-RD/SL)*(D-N1)/(N2-N1)+RD/SL;
}
else if( (N3≦D) && (D<N4) ){
  P1=(RD-RD/SL)*(N4-D)/(N4-N3)+RD/SL;
}
else if(N4≦D){
  P1=RD/SL;
}
else {
  P1=RD;
}
```

※ DISCHARGE ALL RESULTS OF DIVISION

CONTROLLING DOT CONNECTIVITY IN BINARIZING AN IMAGE

FIELD OF THE INVENTION

This invention relates to an image processing apparatus and method for converting a multilevel image to a binary image. More particularly, the invention relates to an image processing apparatus and method capable of changing dot connectivity when binarization is performed in dependence upon a parameter.

BACKGROUND OF THE INVENTION

Many methods of binarizing multilevel image data in order to output the data to a binary (bi-level) printer such as an ink-jet printer have been proposed. One binarization processing technique known in the art is the error diffusion method, which is a method of reproducing pseudo-halftones.

As disclosed in R. W. Floyd and L. Steinberg, "Adaptive algorithm for spatial grey scale", SID Int. Sym. Digest of Tech. Papers, p. 36–37 (1975), the error diffusion method binarizes (converts to a maximum density level or maximum contrast level) multilevel image data of a pixel of interest, weights the error between the binarized level and the multilevel data that prevailed prior to binarization and adds the weighted error to the data of pixels neighboring the pixel of interest.

An example of a generally known apparatus which uses such a binarization method is a copier having a plurality of printing elements which print in accordance with thermal transfer or ink-jet technology. Another example is an electrophotographic copier which uses light-emitting elements such as LEDs.

Such copiers have a reading unit equipped with an optoelectric transducer such as a CCD and convert a document image to an electric signal by causing the reading unit to scan the document. Printing is performed by driving a plurality of printing elements on a printhead based upon the electric signal obtained by scanning, and the document image is reproduced on a printing medium such as printing paper by a well-known electrophotographic process or ink-jet technique.

A copier/MFP (multifunction printer) in which an image read by a reader can be printed directly by another printer via a network has been proposed in recent years.

FIG. 21 is a diagram illustrating the configuration of a network-connected image processing system.

As shown in FIG. 21, the system includes MFPs 2101, 2104 in which an image that has been read by a self-contained reader is printed out directly by each printer, a backbone network 2102, a computer 2103, a copier 2105 having a printing function and a printer 2016.

The computer 2103 is located in an environment in which each printer or the copier is capable of printing out images via the network 2102. Further, the MFP 2101 is capable of outputting an image read by its self-contained reader to the other printers or to the copier directly via the network 2101 without the intermediary of the computer 2103. Such output is possible irrespective of whether models are of the same type, such as the MFP 2104.

In such cases it is desirable for a read image to be transmitted upon being binarized in order to reduce the load on the network 2102. Accordingly, there are many cases in which use is made of error-diffusion-type binarization, which exhibits excellent tone reproduction and resolution.

Often, however, the reproducibility of isolated dots in electrophotography or the like is dependent upon the print engine. There are instances where an image having very poor tone reproduction is output, depending upon the printer, owing to variations in isolated-dot reproduction from one engine to another.

Further, the reproducibility of isolated dots depends greatly upon the process conditions, and dot reproducibility varies markedly owing changes in process conditions brought about by changes in the environment or change with time.

With error-diffusion-type binarization, there is a high likelihood that dots will be printed in isolated form and hence the effects brought about by discrepancies in the reproducibility of isolated dots is great.

SUMMARY OF THE INVENTION

Accordingly, an object of the present invention is to provide an image processing apparatus and method in which the connectivity of a binary image is controlled to deal with a change in binary-image reproducibility caused by differences in the characteristics of image output devices on a network and by changes in the environment and change with time, thereby making it possible to optimize connectivity, achieve stable reproduction and improve image quality.

According to the present invention, the foregoing object is attained by providing an image processing apparatus having input means for inputting, pixel by pixel, a multilevel image containing gray-scale information, and binarization means for binarizing the multilevel image, which has been input by the input means, to a binary image, the apparatus comprising: communication means for communicating with an external image output device via a network; characteristic-information storage means for receiving characteristic information of the external image output device from the communication means and storing the characteristic information; connectivity control means for controlling connectivity of a binary image, which is binarized by the binarization means, based upon the characteristic information stored by the characteristic-information storage means; and transmitting means for transmitting the binary image, the connectivity of which has been controlled by the connectivity control means, to the external image output device via the communication means.

Further, according to the present invention, the foregoing object is attained by providing an image processing apparatus having input means for inputting, pixel by pixel, a multilevel image containing gray-scale information, and binarization means for binarizing the multilevel image, which has been input by the input means, to a binary image, the apparatus comprising: communication means for communicating with an external image output device via a network; characteristic-information storage means for storing characteristic information of the external image output device; connectivity control means for controlling connectivity of a binary image, which is binarized by the binarization means, based upon the characteristic information stored by the characteristic-information storage means; and transmitting means for transmitting the binary image, the connectivity of which has been controlled by the connectivity control means, to the external image output device via the communication means.

Further, according to the present invention, the foregoing object is attained by providing an image processing apparatus having input means for inputting, pixel by pixel, a multilevel image containing gray-scale information, and binarization means for binarizing the multilevel image, which has been input by the input means, to a binary image, the apparatus comprising: communication means for communicating a parameter with an external image output device via a network, the parameter controlling connectivity of a binary image binarized by the binarization means; connectivity control means for controlling connectivity of a binary image, which is binarized by the binarization means, based upon a parameter of an output destination obtained by the communication means; and transmitting means for transmitting the binary image, the connectivity of which has been controlled by the connectivity control means, to the external image output device via the communication means.

Further, according to the present invention, the foregoing object is attained by providing an image processing apparatus having input means for inputting, pixel by pixel, a multilevel image containing gray-scale information, and binarization means for binarizing the multilevel image, which has been input by the input means, to a binary image, the apparatus comprising: communication means for communicating with an external image output device via a network; reading means for reading a test pattern for detecting connectivity; parameter calculation means for calculating a parameter, which controls connectivity of a binary image binarized by the binarization means, in conformity with results obtained from the reading means; connectivity control means for controlling connectivity of a binary image, which is binarized by the binarization means, based upon the parameter calculated by the parameter calculation means; and transmitting means for transmitting the binary image, the connectivity of which has been controlled by the connectivity control means, to the external image output device via the communication means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a diagram illustrating, in terms of C programming language, processing for calculating a threshold value;

FIG. 20 is a diagram illustrating, in terms of C programming language, control of amount of addition performed by an addition-quantity controller;

DESCRIPTION OF THE PREFERRED EMBODIMENTS

Embodiments of the present invention will now be described in detail with reference to the drawings.

First Embodiment

Figure 1:
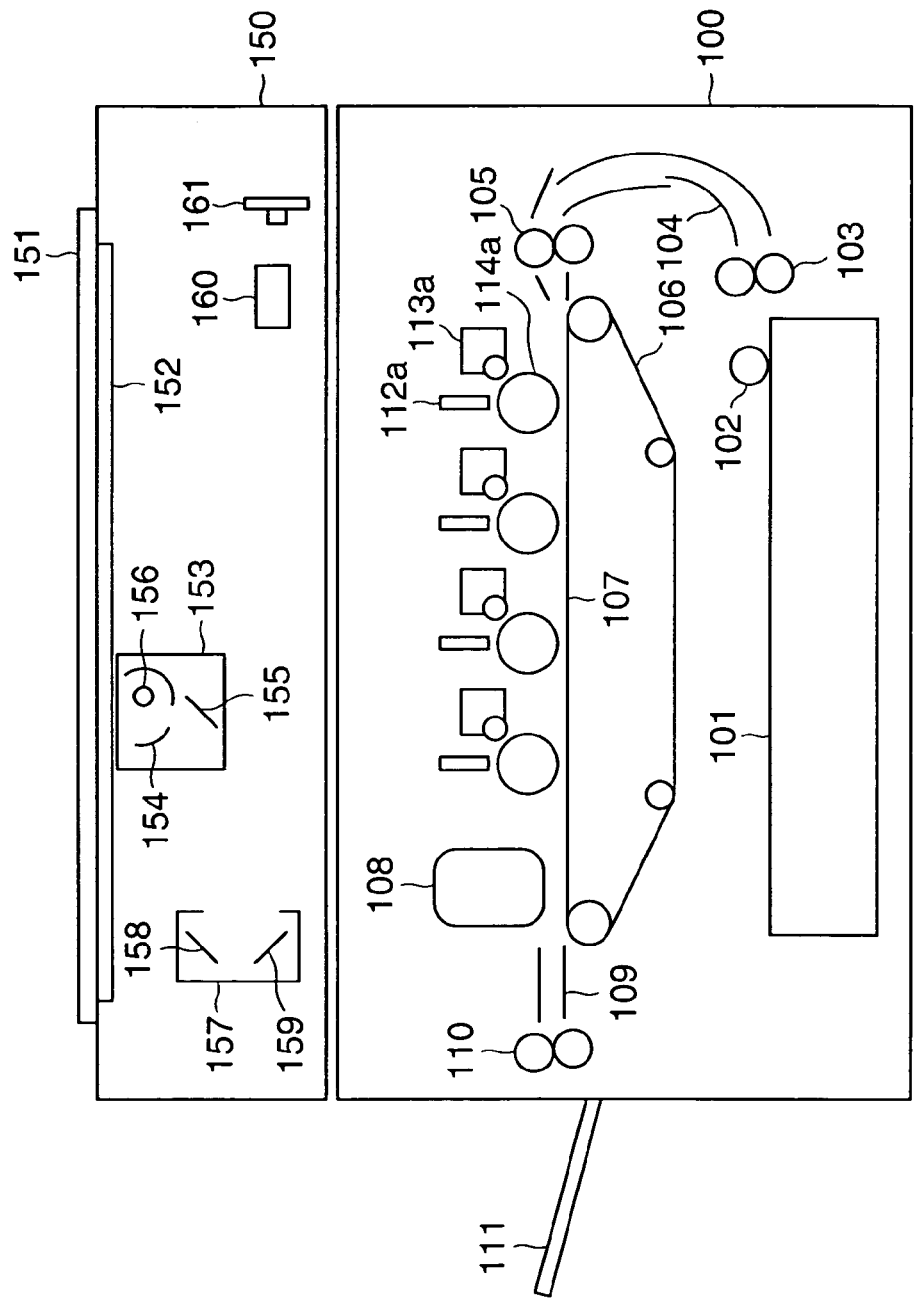
FIG. 1 is a diagram showing the structure of a printing apparatus capable of copying an image in accordance with a first embodiment of the invention.

FIG. 1 is a diagram showing the structure of a printing apparatus capable of copying an image in accordance with a first embodiment of the invention.

As shown in FIG. 1, A document reader 150 includes a document glass 152 on which a document is placed. The document is illuminated by light from an illuminating lamp 156 and light diffused by a diffuser 154, light reflected from the document is reflected by mirrors 155, 158, 159 and passes through a lens 160 so that an image is formed on a CCD 161. The latter converts the light image to an electric signal to obtain an image signal.

The CCD 161 in this embodiment has 7200 pixels arrayed from front to back and is composed of three rows of pixels, namely R (red), green (G) and blue (B) rows.

A reading unit 153 on which the mirror 155 and lamp 156 are mounted moves to the left and right on rails (not shown), and a mirror unit 157 mounting the mirrors 158, 159 moves in sync with the reading unit 153. These two units are capable of reading a document in its entirety by being moved left and right.

A document cover 151 presses the document against the document glass 152.

The image signal read by the document reader 150 is subjected to image processing (described in detail later) and then sent to a printer 100. The latter has a pick-up roller 102 which pulls a sheet of paper from a cassette 101 containing paper as the printing medium. The sheet of paper passes through first registration rollers 103, guide plates 104 and second registration rollers 105 and is attracted to a conveyance belt 106.

Meanwhile, the image signal is divided into the four colors C, M, Y, K. The C (cyan) signal is changed to a light signal by an LED array 112a and is recorded on a drum 114a as a latent image. The latent image on the drum 114a is developed by a developing unit 113a to form a toner image on the drum 114a. The developed toner image is transferred to the paper on a platen 107.

The above-described process is the well-known electrophotographic process. The remaining colors M (magenta), Y (yellow) and K (black) are similarly subjected to this electrophotographic process by the LED array, drum and developing units, whereby the color images are transferred to the paper.

The toner that has been transferred to the paper is fixed to the paper by a fixing unit 108. Following the completion of toner fixation, the paper is ejected into a drop tray 111 via paper ejection rollers 110.

Figure 2:
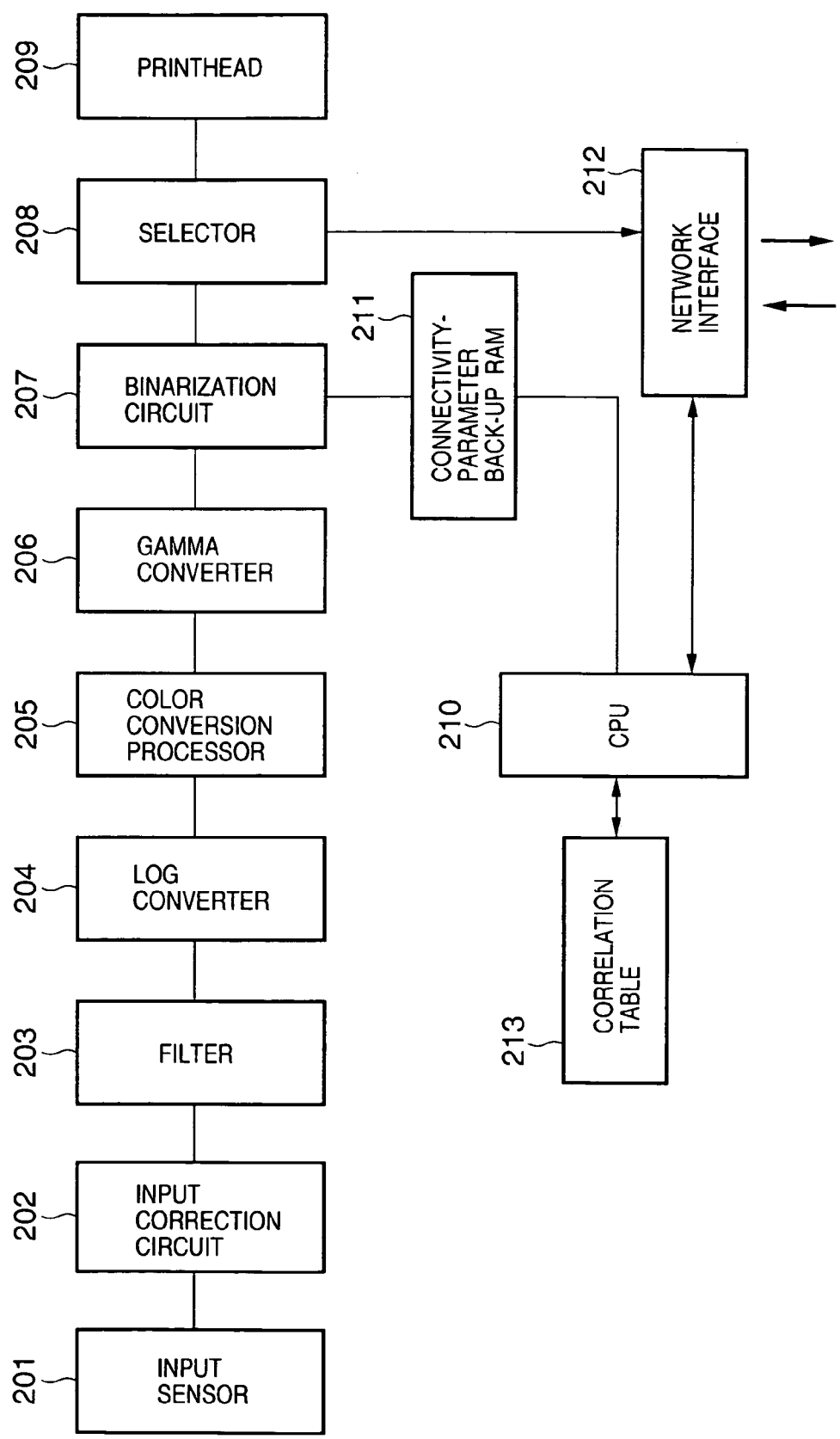
FIG. 2 is a block diagram illustrating the construction of an image processing section according to the first embodiment.

FIG. 2 is a block diagram illustrating the construction of an image processing section according to the first embodiment.

As shown in FIG. 2, the image processing section includes an input sensor 201, which comprises an optoelectric transducer such as a CCD and a driving device for driving the transducer, for reading and scanning a document. An input correction circuit 202 sequentially inputs image data representing the document read by the input sensor 201, quantizes each pixel of the image data to digital data and executes digital processing to perform a shading correction or the like for correcting sensitivity unevenness of the CCD sensor and illumination unevenness caused by the illuminating light source.

A digital filter circuit 203 subjects the input image data to edge emphasis and smoothing. A LOG conversion circuit 204 converts RGB image data to CMY data by a look-up table, not shown. A color conversion processing circuit 205 uses a multidimensional mapping table (not shown) to execute color conversion processing that corresponds to the colorization characteristic of the printing toner (or ink).

A gamma conversion circuit 206 uses a one-dimensional look-up table (not shown) to apply a correction so as to linearize tone in dependence upon the printing tone characteristic of the printer. A binarization circuit 207 quantizes multilevel image data to binary data. A selector 208 selects whether to print out the binarized image data or to transmit it to a network. A printhead 209 is controlled to turn dots on or off, thereby to reproduce the image, based upon binary data sent from the binarization circuit 207 by the selector 208.

A CPU 210 identifies a printer with which this system is communicating via the network and selects or calculates connectivity parameters that are optimum for this printer. The CPU 210 controls the overall apparatus in accordance with a program and control data stored in a ROM, not shown. A RAM 211 backs up the connectivity parameters. A network interface 212 serving as network communication means communicates with another printer and sends print data via a network. A correlation table 213 stores the correlation between the print characteristics of each of the printers and connectivity parameters.

In a case where a connectivity parameter is set in the arrangement described above, first the network interface 212 communicates with the printer where printing is to be performed. Information representing the engine of this printer is sent to the CPU 210. The engine information is information indicating whether the printer at the communication destination has a print engine which operates in accordance with the ink-jet technique, an electrophotographic technique using LEDs or an electrophotographic technique using a laser.

A connectivity parameter that is optimum for the printer is calculated by the CPU 210 from the engine information that has been sent. The relationship between engine information and connectivity parameter is found in advance by experimentation, and the correlation is put into table form and stored in the correlation table 213. For example, since an electrophotographic printer using an LED or laser has an isolated-dot reproducibility inferior to that of an ink-jet printer, the parameter is set so as to strengthen connectivity in areas where density is low.

The connectivity parameter is calculated from the relations in the correlation table 213. In a case where there are several connectivity parameters, these may be divided into groups. Further, the parameters may be calculated by a circuit using membership functions or the like. A calculated connectivity parameter is stored in the RAM 211. When printing is actually performed, the binarization circuit 207 binarizes the image signal using the parameter in the back-up RAM 211.

The details of the binarization circuit 207 will now be described.

Figure 3:
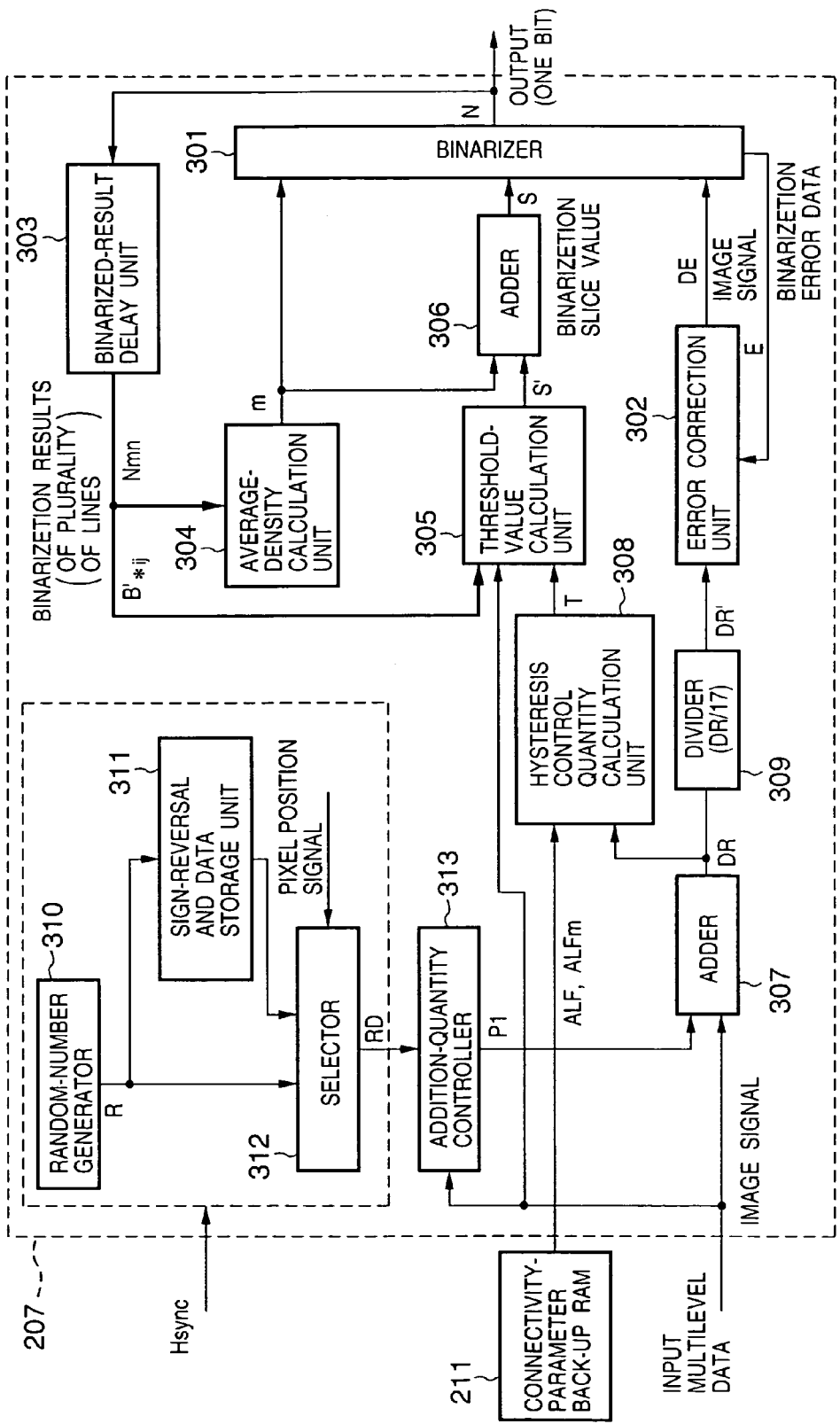
FIG. 3 is a block diagram illustrating the details of construction of a binarization circuit.

FIG. 3 is a block diagram illustrating the details of construction of the binarization circuit 207. The overall flow of signals will be explained before describing the blocks of the binarization circuit and the connectivity parameter in detail.

The binarization circuit 207 includes an error correction unit 302 the inputs to which are error data E, which has been generated by a binarizer 301, and a signal DR' obtained by adding a random number (described later) to an input multilevel signal D from the gamma conversion circuit 206 and dividing the sum by a constant 17.

The error correction unit 302 subjects the entered error data E to an error correction in n-pixel units and outputs the result to the binarizer 301 as an image signal DE.

The inputs to the binarizer 301 are the image signal DE, a binarization slice value S, described later, and a calculated value m of average density, described later. The binarizer 301 compares the image signal DE and the binarization slice value S to obtain a binary output N. The binarizer 301 then subtracts the calculated value m of average density from the image signal DE to calculate binarization error data E.

A binarized-result delay unit 303 receives the binary output N as an input, applies a delay of a prescribed number of lines and sends the resulting data to an average-density calculation unit 304 and threshold-value calculation unit 305 as binarization results Nmn and B*ij of a plurality of lines.

The average-density calculation unit 304 receives the binarization results Nmn of a plurality of lines as an input, applies a multiply-and-accumulate operation to coefficients that have been set in advance and to the delayed binarized result and outputs the calculated value m of average density to an adder 306 and binarizer 301.

The output B*ij from the binarized-result delay unit 303, the input multilevel data D and an output T from a hysteresis control quantity calculation unit 308 are input to the threshold-value calculation unit 305. The latter calculates a threshold-value control quantity for any density area in conformity with the B*ij signal, which indicates a past binarization condition (pattern), and sends the calculated value to the adder 306 as a binarization slice value S'.

The signals from the average-density calculation unit 304 and threshold-value calculation unit 305 are input to the adder 306, which adds these signals and outputs the sum to the binarizer 301 as the binarization slice value S. An adder 307 adds the input image signal D and a signal P1 from an addition-quantity controller 313, described later, and outputs the sum DR.

Using the signal DR from the adder 307, the hysteresis control quantity calculation unit 308 according to this invention calculates a hysteresis control quantity based upon a technique described later and outputs the control quantity to the threshold-value calculation unit 305. The hysteresis control quantity is controlled by referring to values in the back-up RAM 211 which stores the connectivity parameters.

A divider 309 divides the input signal DR by the constant 17 and outputs only the product DR'. Any remainder is discarded in its entirety. A random-number generator 310 generates an m-series random number R of −17 to 7 through a technique described later and outputs the random number R to a selector 312 and to a sign-reversal and data storage unit 311.

The sign-reversal and data storage unit 311 reverses the sign of the random number R, retains the data for only a fixed number of pixels, described later, and then outputs the retained random number to the selector 312. The latter produces an output by switching between the signal from the random-number generator 310 and the signal from the sign-reversal and data storage unit 311 in response to a pixel position signal having a timing described later.

In accordance with the value of the image signal D, the addition-quantity controller 313 controls the amplitude of the random-number output value using a technique described later.

Binarization processing is executed by the binarization circuit 207 constructed as set forth above.

The details of each component shown in FIG. 3 will now be described.

First the hysteresis control quantity calculation unit 308 of this invention will be described with reference to FIG. 4.

The hysteresis control quantity calculation unit 308 varies the value of a constant ALF (=32) in accordance with the input signal DR and outputs the hysteresis control signal T. The arrangement is such that a change in the hysteresis control signal T causes a change in binarization connectivity.

The constant ALF is the above-mentioned connectivity parameter and is implemented by a register retained in the back-up RAM 211. Similarly, ALFm is a register held in the back-up RAM 211. If the value of constant ALF is enlarged, dot connectivity in binarization processing increases. Conversely, if the value of ALF is made to approach zero, control to reduce connectivity is carried out. It is also possible to adjust the hysteresis quantity in any density area by constants LR1, LR2, LR3, LR4 set by the CPU 210.

Figure 4:
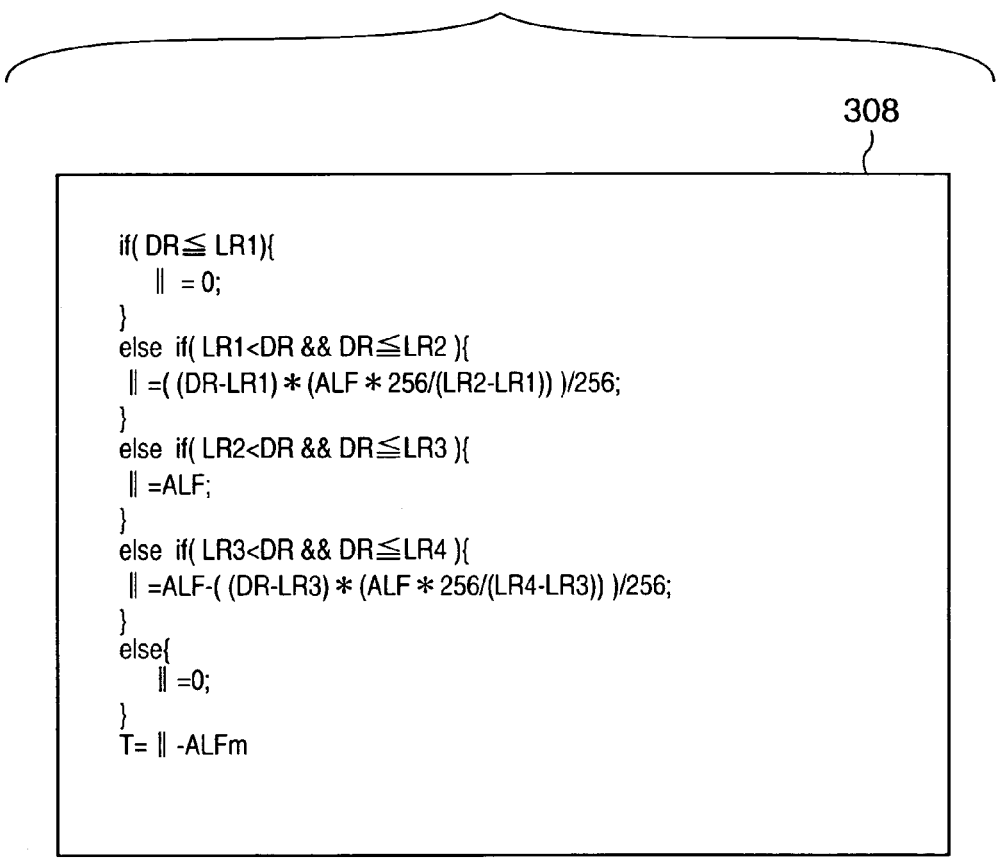
FIG. 4 is a diagram illustrating, in terms of C programming language, processing for calculating a hysteresis control quantity.

FIG. 4 illustrates, in terms of C programming language, processing for calculating the hysteresis control quantity. In a case where the entered signal DR is equal to or less than the constant LR1 (=16), processing for setting ll to "0" is executed. In a case where the entered signal DR is greater than LR1 and equal to or less than the constant LR2 (=48), ll is found in accordance with the following equation:

$$ll=\{(DR-LR1)*[ALF*256/(LR2-LR1)]\}/256$$

According to this calculation, the value of ll gradually approaches the constant ALF (=32) from "0" as the value of the input signal DR increases from the constant LR1 to the constant LR2.

In a case where the input signal DR is greater than LR2 and equal to or less than the constant LR3 (=233), ll is output as the fixed constant ALF. If the input signal DR is greater than the constant LR3 and equal to or less than the constant LR4 (=255), then ll is found in accordance with the following equation:

$$ll=ALF-\{(DR-LR3)*[ALF*256/(LR4-LR3)]\}/256$$

This indicates that the value of ll gradually approaches "0" from the constant ALF (=32) from "0" as the value of the input signal DR increases from the constant LR3 to the constant LR4.

In a case where the input signal DR is greater than LR4, processing for setting ll to "0" is executed.

After the above-described processing is executed, the result of subtracting the constant ALFm (=16) from ll is delivered as the output signal T. The purpose of this subtraction operation is to change the signal T of the hysteresis control quantity calculation unit 308 from a negative to a positive value. This makes possible texture control in any density area over a range of broad latitude.

Figure 5:
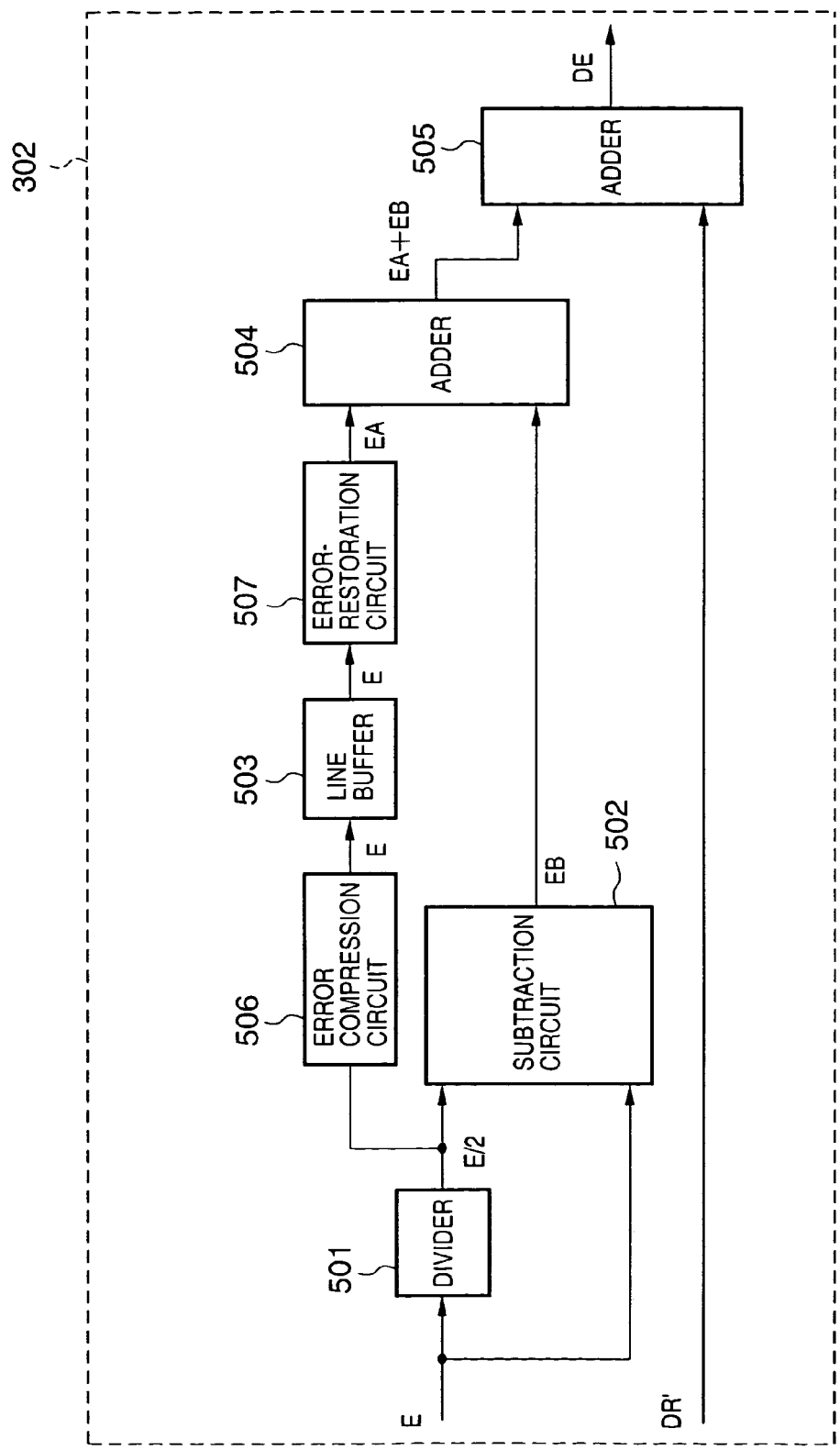
FIG. 5 is a block diagram illustrating the details of construction of an error correction unit.

The error correction unit 302 will be described next. The error correction unit 302 adds the binarization error data E to the image signal DR' to calculate the image signal DE that has undergone the error correction, then outputs the signal DE to the binarizer 301. The error correction unit 302 has the construction shown in FIG. 5.

The entered binarization error data E is limited to −6 to +6 by limiter processing (not shown) so as not to be influenced by past binarization results, which is referred to as a dot blanking phenomenon as described in U.S. Pat. No. 5,325,448, in a case where the input multilevel data D changes suddenly from high to low density. The binarization error data E limited to −6 to +6 is halved by a divider circuit 501. The result is branched in two directions so as to enter a subtraction circuit 502 and an error compression circuit 506.

Figure 6:
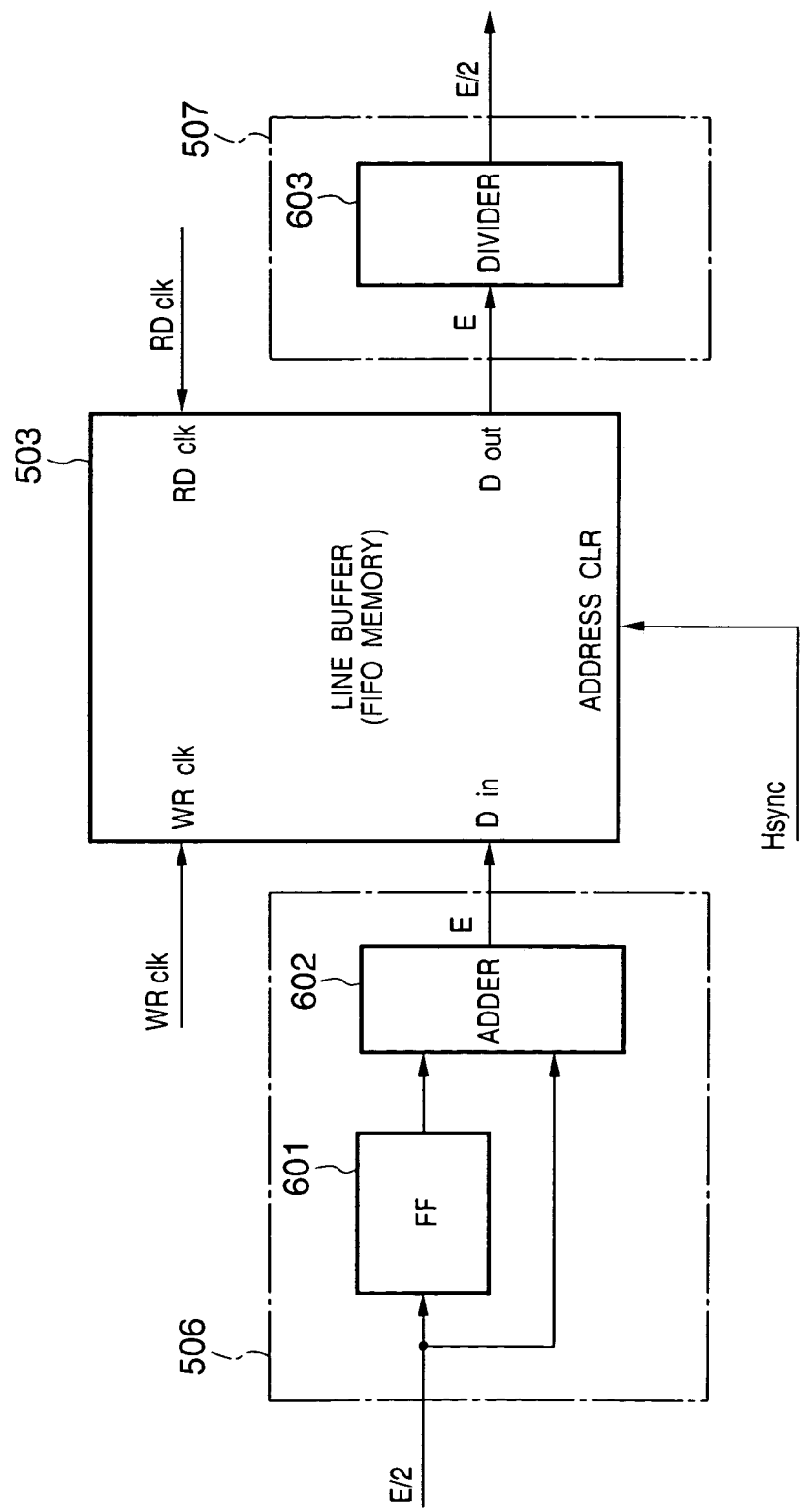
FIG. 6 is a diagram illustrating the details of construction of an error compression circuit and error restoration circuit.

The subtraction circuit 502 calculates the difference EB (=E−E/2) between the binarization error data E and E/2 and outputs this difference to an adder 504. The error compression circuit 506 adds quantization error in two-pixel units and outputs the sum to a line buffer 503. FIG. 6 is a diagram illustrating the details of construction of the error compression circuit 506 and an error restoration circuit 507.

Figure 7:
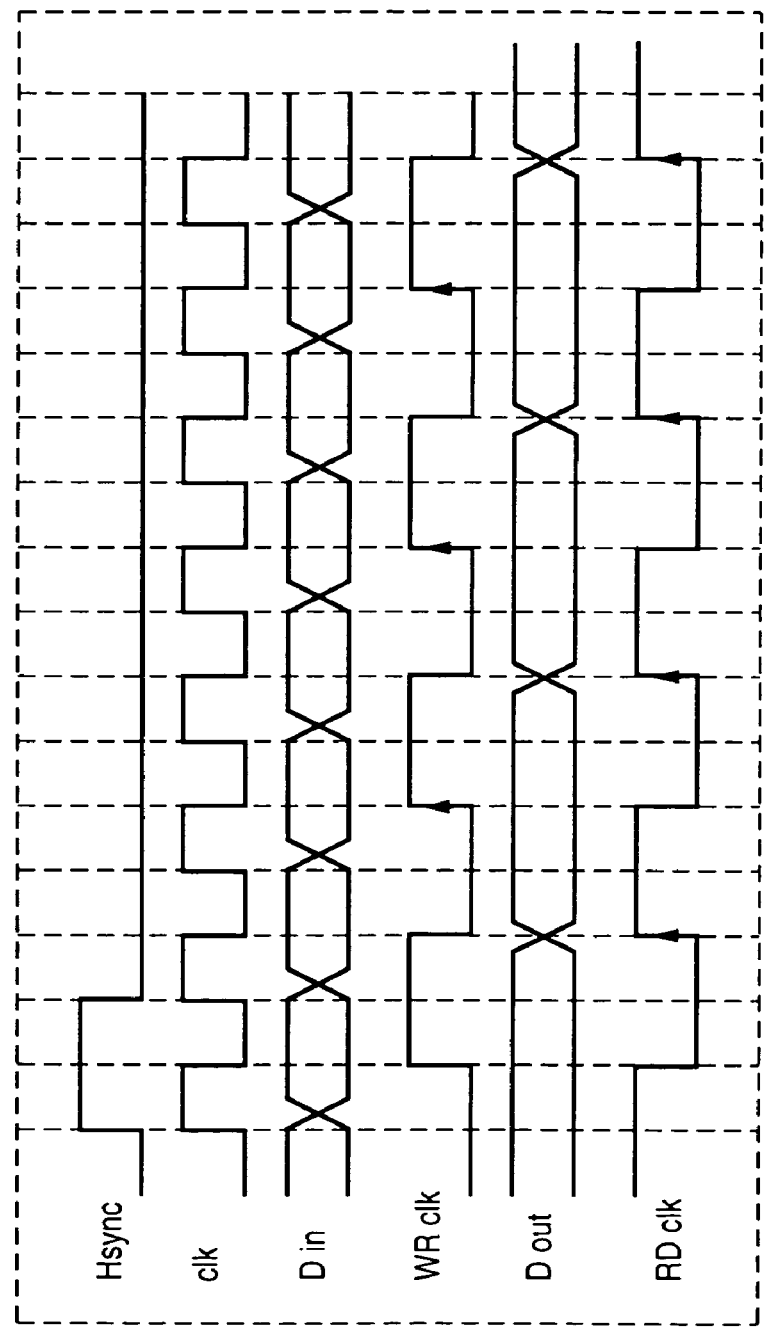
FIG. 7 is a diagram illustrating timing at which a line buffer is accessed.

The error compression circuit 506 shown in FIG. 6 includes an adder 602 for adding the entered E/2 and data delayed one pixel by a flip-flop 601 and writes the resulting data to the line buffer 503 at a timing WRclk shown in FIG. 7.

Figure 8:
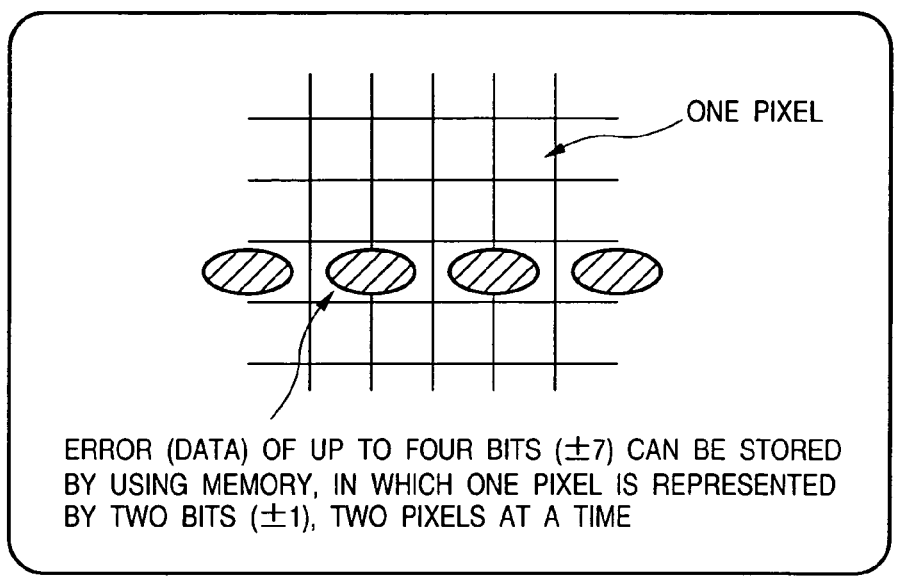
FIG. 8 is a conceptual view illustrating processing for writing data to the line buffer.

More specifically, the error compression circuit 506 adds quantization error, which has entered at a timing 0, 1, 2, 3, 4, 5, . . . in terms of pixel position, in sets of "0, 1", "2, 3", "4, 5", . . . and writes the results to memory at the timing 1, 3, 5, . . . . This is illustrated conceptually in FIG. 8. By using a memory, in which one pixel is represented by two bits (±1), two pixels at a time, it is possible to store an error (data) of up to four bits (±7).

Storing quantization-error vales in two-pixel units is advantageous in that it broadens the latitude of the timing at which the memory is accessed and makes it possible to reduce memory capacity.

The quantization-error value of the preceding line is read out of the line buffer 503 at the timing RDclk shown in FIG. 7 and is input to the error-restoration circuit 507.

The error compression circuit 506 sums the quantization-error value in two-pixel units and stores the result in the line buffer 503. When the result is read out of the line buffer 503, therefore, the error-restoration circuit 507 halves the result using the divider circuit 603, as shown in FIG. 6. The quantization-error value read out of the line buffer 503 used in correcting the error of each pixel is the same as that in terms of two-pixel units. However, the necessary capacity of the line buffer 503 can be reduced with almost no decline in image quality resulting from this arrangement.

With reference again to FIG. 5, the adder circuit 504 calculates the sum of the output EA from the error-restoration circuit 507 and the output EM from the subtraction circuit 502 and outputs the sum to an adder circuit 505. The latter calculates the sum of EA and EB delayed by one line and the image signal DR' and delivers the sum as image signal DE.

Figure 9:
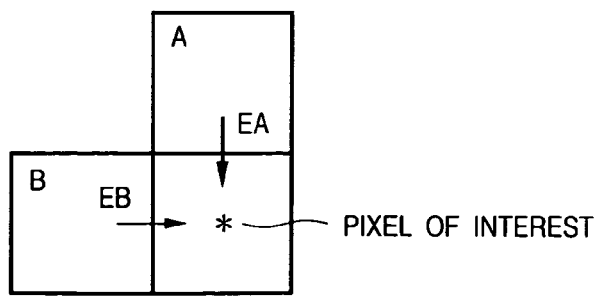
FIG. 9 is a diagram useful in describing addition processing performed by the error correction unit.

As shown in FIG. 9, the error correction unit 302 adds the value of binarization error EA obtained when "A" on the overlying line is binarized and the value of binarization error EB when "B" of the preceding pixel is binarized to the data of a pixel of interest indicated by "*", as illustrated in FIG. 9.

Figure 10:
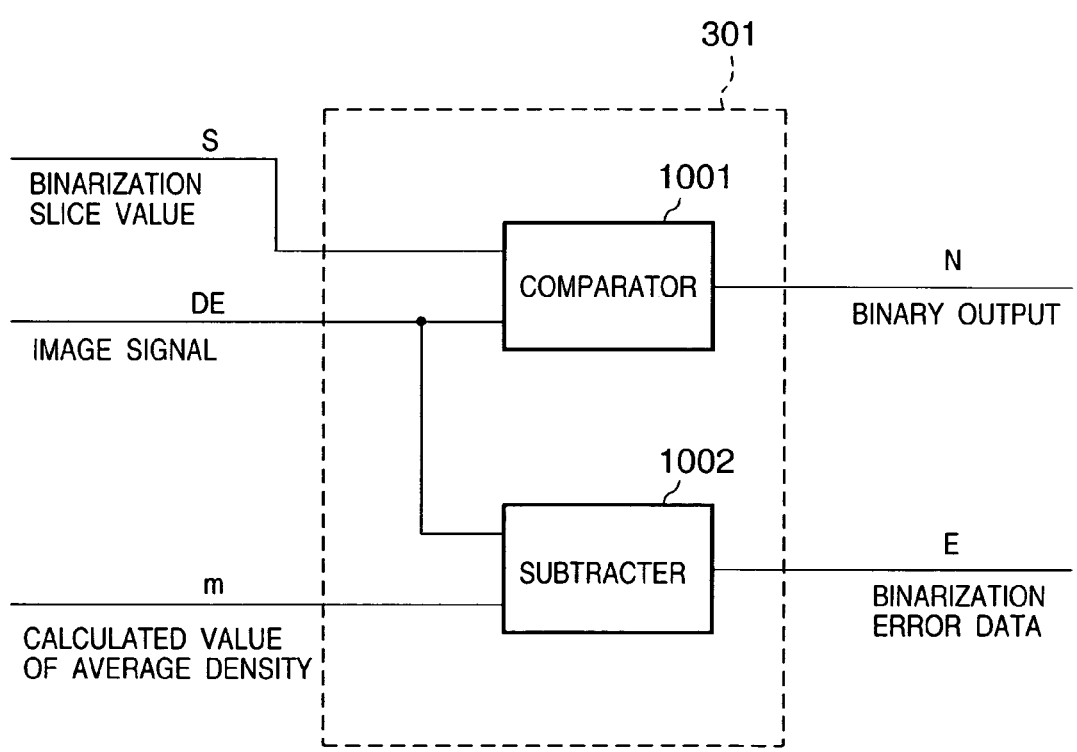
FIG. 10 is a block diagram illustrating the details of construction of a binarizer.

Next, the binarizer 301, which receives the image signal DE, the binarization slice value S (described later) and the calculated value m of average density (described later) as inputs and compares these to deliver the binary output N and the binarization error data E. The binarizer 301 is illustrated in FIG. 10.

The input image signal DE enters a comparator circuit 1001 and a subtractor circuit 1002. The comparator circuit 1001 compares the value of the image signal DE and the value of the binarization slice value S and delivers the binary output N in the following manner:

N=1 when DE>S holds; and

N=0 when DE≦S holds.

The subtractor circuit 1002 subtracts the calculated value m of average density from the value of image signal DE and outputs the difference E=DE−m as the binarization error data E.

At this time limiter processing (not illustrates) is executed in such a manner that the value of E will fall within the range "−6~+6", as mentioned above.

Figure 11:
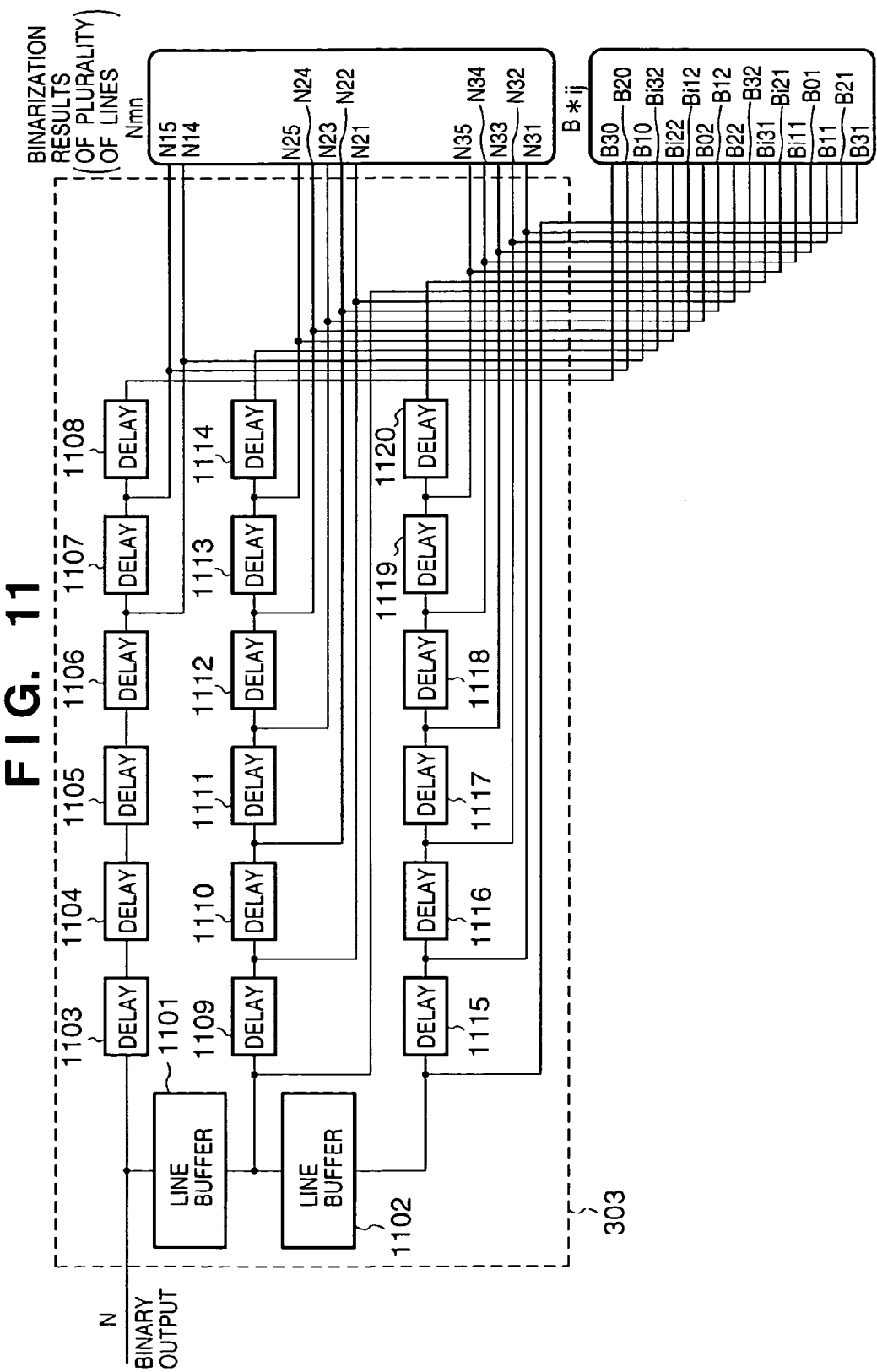
FIG. 11 is a block diagram illustrating the details of construction of a binarized-result delay unit.

The binarized-result delay unit 303, which receives the binary output N from the binarizer 301 as an input, applies a delay of a predetermined number of lines and sends data to the average-density calculation unit 304 and threshold-value calculation unit 305 as the binarization results Nmn, B*ij of a plurality of lines. The construction of the binarized-result delay unit 303 is illustrated in FIG. 11.

The applied binary output N is sent from a one-bit, one-line line buffer 1101 to a line buffer 1102 so that the data is delayed line by line. At the same time, the binary output N is successively delayed one pixel by delay elements 1103 to 1108 each comprising a one-pixel delay circuit. The output of delay element 1106 and the output of delay element 1107 are delivered as outputs N14 and N15, respectively.

The binarized data delayed one line by the line buffer 1101 is delayed by delay elements 1109 to 1114 and the outputs of delay elements 1109 to 1113 are delivered as outputs N21 to N25, respectively. The binarized data delayed one line by the line buffer 1102 is delayed by delay elements 1115 to 1120 and the outputs of delay elements 1115 to 1119 are delivered as outputs N31 to N35, respectively.

At the same time, the outputs of delay elements 1106 to 1108 are delivered as outputs B10, B20, B30, respectively. The binarized data delayed one line by the line buffer 1101 is delivered as outputs B32 to B02 and Bi12 to Bi32 after being delayed. The binarized data delayed one line by the line buffer 1102 is delivered as outputs B31 to B01 and Bi11 to Bi31 after being delayed.

Figure 12:
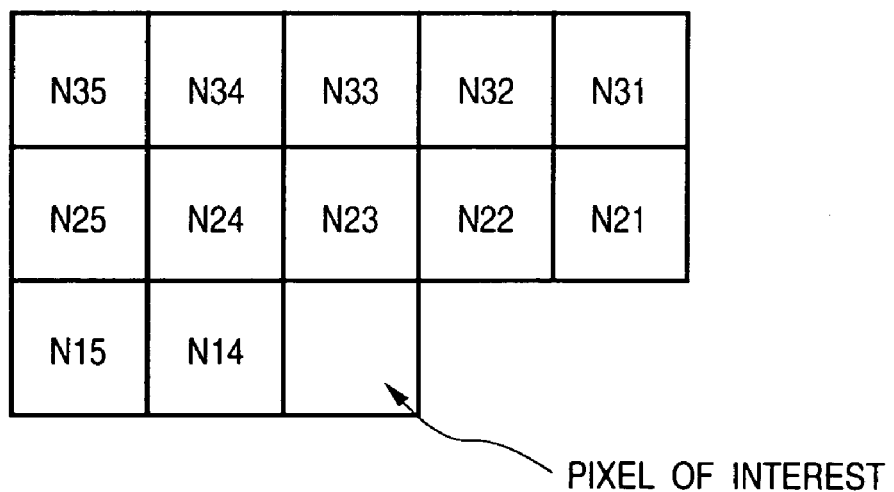
FIG. 12 is a diagram showing the output state of binarization results Nmn of a plurality of lines.

In other words, data obtained by binarizing a two-dimensional image is delayed a plurality of lines and a plurality of pixels and is input to the average-density calculation unit 304 as the binarization results Nmn of a plurality of lines in the manner shown in FIG. 12.

Figure 13:
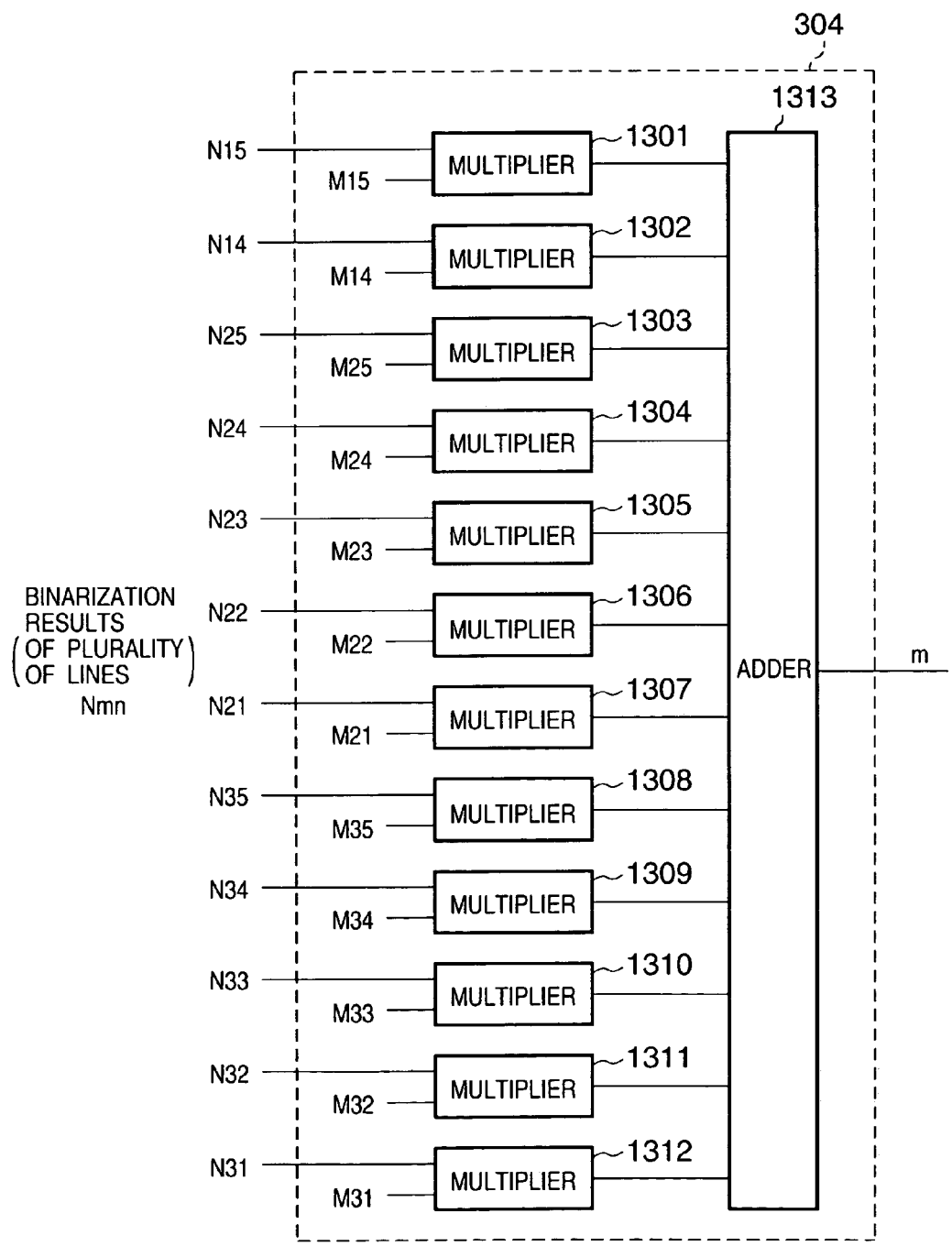
FIG. 13 is a block diagram illustrating the details of construction of an average-density calculation unit.

The binarization results Nmn of a plurality of lines are input to the average-density calculation unit 304, which performs a multiply-and-accumulate operation based upon coefficients that have been set in advance and the delayed results of binarization and outputs the data m used by the binarizer 301 and adder 306. The construction of the average-density calculation unit 304 is shown in FIG. 13.

Figure 14:
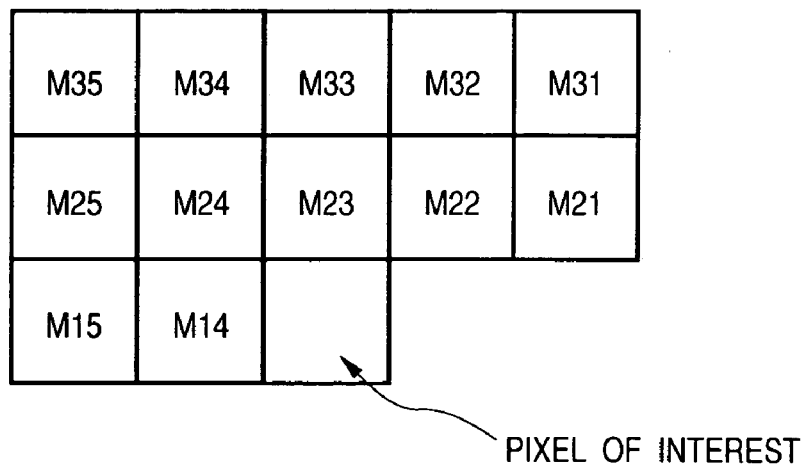
FIG. 14 is a diagram illustrating an example of coefficients when processing for calculating average density is executed.

A multiplier circuit 1301 receives the binarized data N15 and a coefficient M15 as inputs, multiplies these and outputs the product. A multiplier circuit 1302 receives the binarized data N14 and a coefficient M14 as inputs, multiplies these and outputs the product. The above operation is performed in similar fashion by multiplier circuits 1303 to 1312. The products obtained by these multiplication operations are summed by an adder circuit 1313. The sum is output as the calculated value m of average density. FIG. 14 is a diagram illustrating an example of coefficients when processing for calculating average density is executed.

The threshold-value calculation unit 305 will be described next. FIG. 15 is a diagram illustrating, in terms of C programming language, processing for calculating a threshold value.

First the threshold-value calculation unit 305 divides the value of the applied signal T from the hysteresis control quantity calculation unit 308 by each of constants LT1 (=2) and LT2 (=4) to obtain variables A (=T/LT1), B (=T/LT2) used internally.

Next, through a method described below, the threshold-value calculation unit 305 controls the value of the binarization slice value S' by the variables A, B and constants in dependence upon the array (pattern) of results of binarizing the output B'*ij from the binarized-result delay unit 303.

Figure 16:
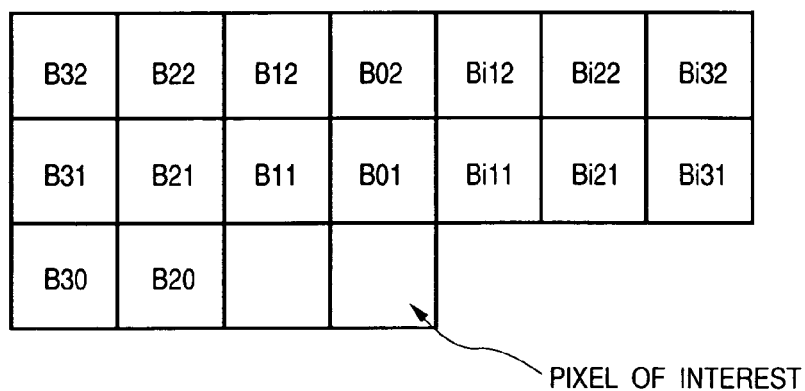
FIG. 16 is a diagram illustrating an array (pattern) of results of binarization.

FIG. 16 is a diagram illustrating an array (pattern) of results of binarization.

In this example, reference is not made to the pixel immediately preceding the pixel of interest in order to achieve high-speed processing. Of course, if sufficiently fast logic is incorporated, the pixel immediately preceding the pixel of interest may be referred to without problems.

Described next will be processing for actually controlling the binarization slice value S in dependence upon the array (pattern) of results of binarization.

In a case where binarization conditions surrounding a pixel of interest are as set forth below, the binarization slice value S is output upon being set forcibly to the maximum constant 15. The purpose is to make it difficult to print a dot.

B32==0&&B22==1&&B12==0&&B21==0&&B11==1&&B01==0 or

Bi12==0&&Bi22==1&&Bi32==0&&B01==0&&Bi11==1&&Bi21==0

In a case where binarization conditions surrounding a pixel of interest are as set forth below and, moreover, input multilevel data D is less than 31 (31 in 0 to 255), the binarization slice value S is output upon being set forcibly to the maximum constant 15. The purpose is to make it difficult to print a dot when the above-mentioned conditions hold.

B12==0&&B02==0&&Bi12==0&&Bi22==0&&Bi32==0&&

B11==0&&B01==0&&Bi11==1&&Bi21==0&&Bi31==0&&B20==0

On the other hand, in a case where the input multilevel data D is equal to or greater than 31 (31 in 0 to 255) under the above-described conditions, the binarization slice value S is output upon being set to an average-density value of zero. This is to assure that texture control will not be carried out in a case where the past results of binarization have a specific array (pattern). Of course, the constant 31 need not be a decided value and can be a parameter that is set another value such as 48 or 64.

If the value is made larger than 31, texture control tends to be applied more easily. Conversely, if the value is made smaller than 31, it goes without saying that texture control becomes less likely to be applied.

In a case where binarization conditions surrounding a pixel of interest are as set forth below, the binarization slice value S is output upon being set to −A.

B02==0&&Bi12==0&&B11==0&&B01==1&&Bi11==1&&Bi21==0&&

B20==0

Here the purpose is to make it easier to print a dot when the above-described conditions hold. Processing is executed without referring to results of binarizing the pixel immediately preceding the pixel of interest.

Similarly, the binarization slice value S' is controlled using the internal variables A, B and constants, without referring to the results concerning the pixel immediately preceding the pixel of interest, in dependence upon each pattern of binarized results. As a result, control is performed to make it easier to print a dot in a case where the calculated value T of amount of hysteresis control is positive and to make it more difficult to print a dot in a case where the calculated value T of amount of hysteresis control is negative.

If the above-described processing is applied successively to each pixel, dot connectivity can be controlled with any amount of dot connectivity and in any density area in conformity with the calculated value T of amount of hysteresis control.

Figure 17:
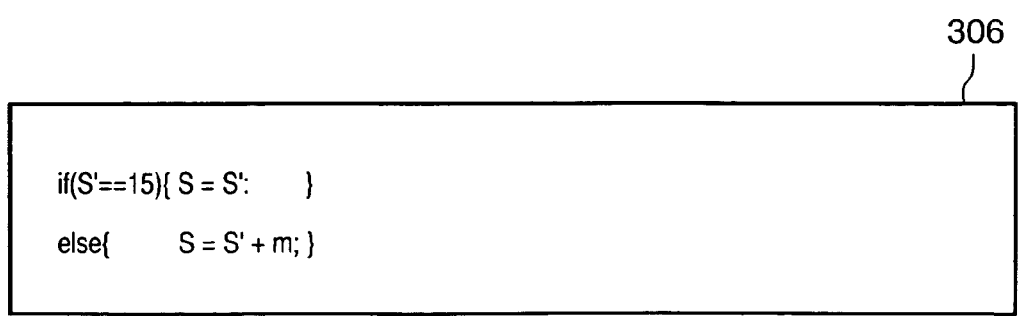
FIG. 17 is a diagram illustrating, in terms of C programming language, an arithmetic operation performed by an adder.

The binarization slice value S' thus obtained is input together with the output m of the average-density calculation unit 304 to the adder 306, which proceeds to add these two signals. When the signal S' is 15, the binarization slice value S is output as 15. At all other times the calculation S=S'+m is performed and the result is output. FIG. 17 is a diagram illustrating this calculation written in C programming language.

Next, the adder 307 adds the random-number P1 (described later), the input multilevel signal D and the constant 8. Since the constant used in division performed by the divider 309 (described later) is 17, the remainder after division will be the maximum 16. It is therefore necessary to make the amplitude of the random number an even number of 16 or greater. Hence the constant 8 is found from the operation $16/2$. This added as a bias component.

Though not illustrated, a limiter is applied so that the sum will fall within the range of 0 to 255. The signal from the adder 307 is input to the divider 309 and hysteresis control quantity calculation unit 308.

As mentioned earlier, the divider 309 divides by the constant 17. The output value at this time is only the quotient obtained by division; the remainder is discarded in its entirety. The output signal DR' from the divider 309 is input to the error correction unit 302, which proceeds to execute error correction processing.

Figure 18:
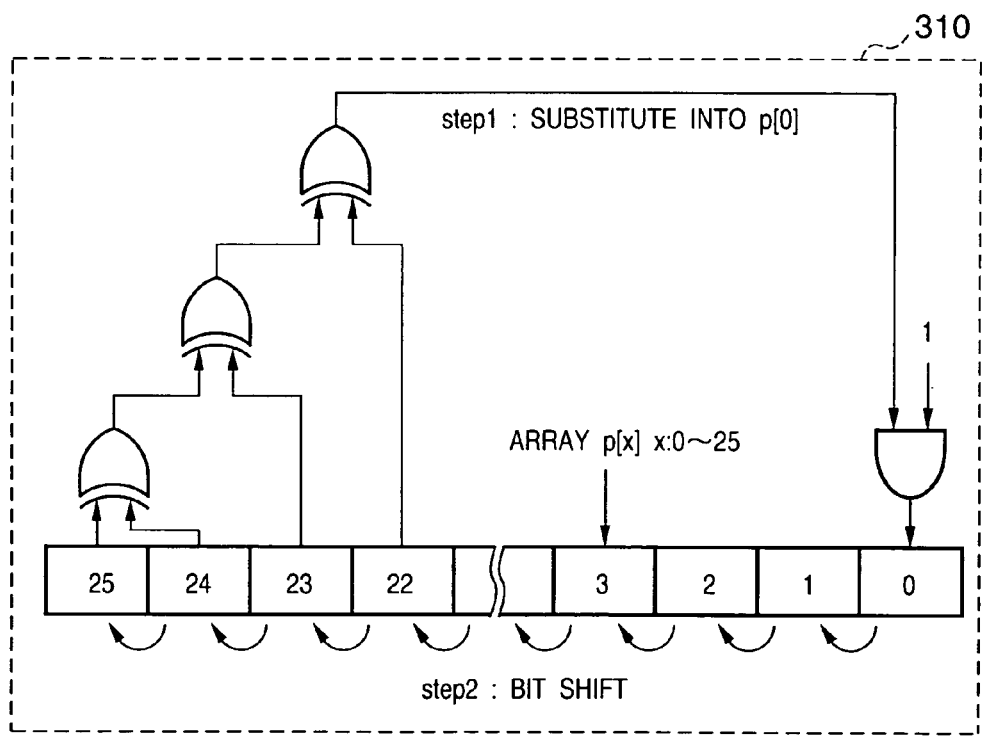
FIG. 18 is a block diagram illustrating the construction of a random-number generator.
Figure 19:
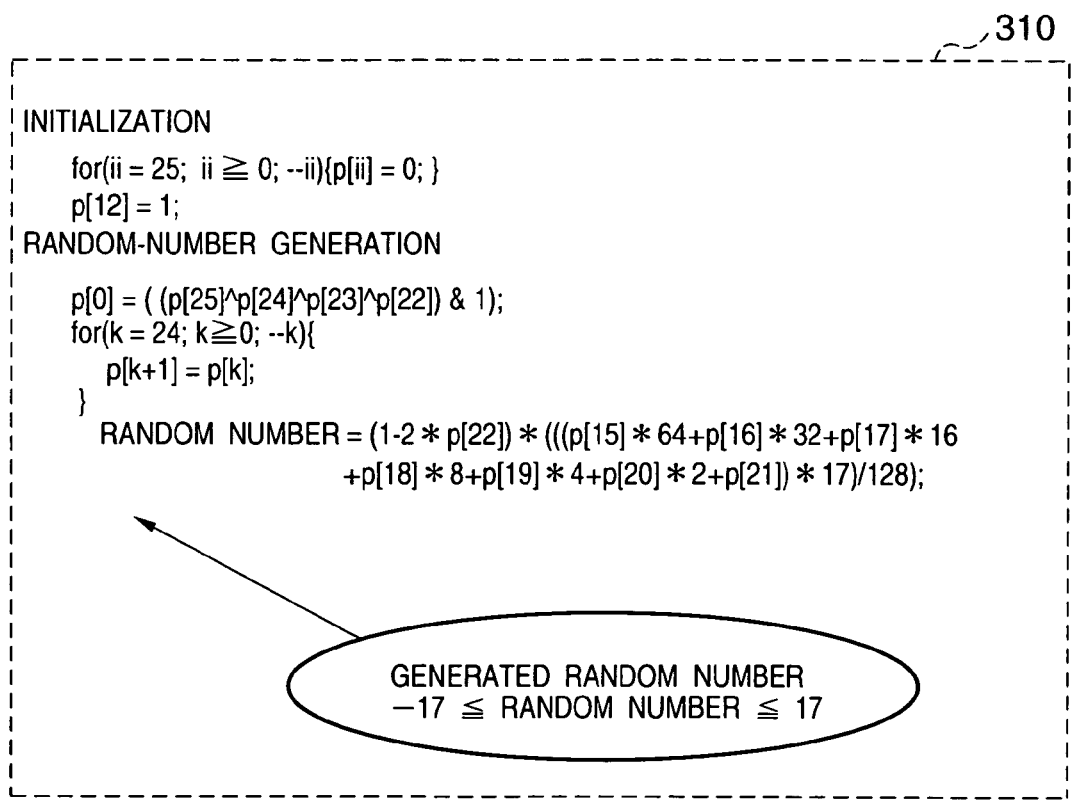
FIG. 19 is a diagram illustrating, in terms of C programming language, the generation of random numbers by the random-number generator.
Figure 21:
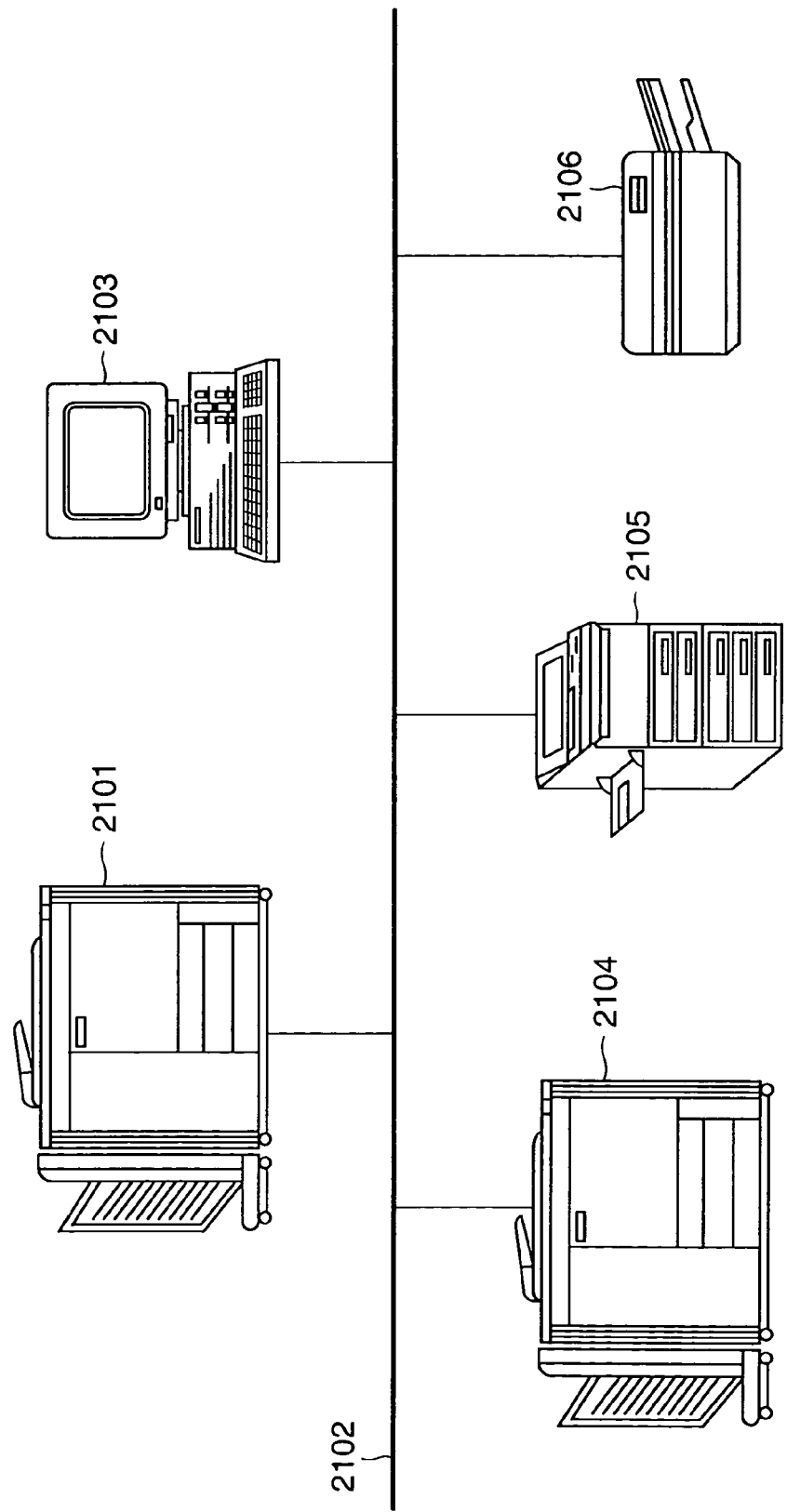
FIG. 21 is a diagram illustrating a network-connected image processing system.

The random-number generator 310, which is a processor for generating the random number R, will now be described. FIG. 18 is a block diagram illustrating the construction of a random-number generator 310 and FIG. 19 illustrates random-number generation written in C programming language.

First, initialization is carried out to write "0" to a register p[ii]: ($0 \leq ii \leq 25$) and to set only a register P[12] to "1". Before a random number is output, the operation p[0]=((p[25]^p[24]^p[23]^p[22])&1) is performed. Random-number vales −17 to 17 are then generated in accordance with the following operation:

random number=$(1-2*p[22])*(((p[15]*64+p[16]*32+p[17]*16+p[18]*8+p[19]*4+p[20]*2+p[21])*17)/128)$ What is important here is that it is necessary to make the maximum value (17 in this embodiment) of the generated random number one-half or more (fractions being discarded) of the divisor (17 in this embodiment) used in the divider 309.

According to this embodiment, the division used in the divider 309 is 17 and, hence we have $17/2=8$ (discarding fractions) and it is necessary that the maximum random number generated by the random-number generator 310 be set to a value of 8 or higher (the value is set to 17 in this embodiment).

The random-number generation described above is applied to all pixels.

The sign-reversal and data storage unit 311 reverses only the sign of the random-number value from the random-number generator 310 generated at pixel positions "p×X" ($p \geq 2$, where p is an even number, and X is an address value in the main-scan direction), holds the result for "p/2" pixels and then outputs the result. For example, if the value of p is "2", random-number values generated at pixel positions "p×X", namely at pixel positions "0, 2, 4, 6, 8, 10, 12, 14, . . . ", are held temporarily and the signs of random-number values that were held at pixel positions "1, 3, 5, 7, 9, 11, 13, 15, . . . " are reversed, after which the values are output.

In this embodiment, refresh is performed one pixel at a time.

The selector 312 switches between delivering the random-number value from the random-number generator 310 generated pixel by pixel and the random-number value from the sign-reversal and data storage unit 311 in accordance with the pixel-position signal.

The pixel-position signal selects the random-number value from the sign-reversal and data storage unit 311 only when the pixel position is "p×X+p/2", ($p \geq 2$, where p is an even number, and X is an address value in the main-scan direction). At all other times the pixel-position signal selects the random-number value from the random-number generator 310.

In a case where the maximum random-number value in the random-number generator 310 is greater than one-half (8 after decimals are discarded) of the divisor (17 in this embodiment) used in the divider 309, the addition-quantity controller 313 applies output control conforming to the input multilevel data D only with respect to this large (superfluous) random number.

FIG. 20 is a diagram illustrating control of amount of addition performed by the addition-quantity controller 313 in C programming language.

A constant SL is decided in such a manner that the maximum value of the output RD from the selector 312 will be one-half the divisor of the divider 309. More specifically, in this embodiment, the maximum value of RD is 17 and the divisor used in the divider 309 also is 17. Accordingly, we have (maximum value of RD)/2=$^{17}/_{2}$=8 (discarding fractions), and the value of SL is set to 8.

In a case where the input multilevel signal D is equal to or less than N1 (e.g., 16), the minimum necessary random number is added in accordance with the calculation "P1=RD/SL".

The minimum necessary random number referred to here means that the deviation in the random number is made "−8 to 8" because the divisor in the divider 309 is "17".

In other words, letting $\alpha$ (=16) represent the deviation in the random number, the divisor used in the divider 309 satisfies the relation $|\alpha+1|$ (=17).

In a case where the input multilevel data D is greater than N1 and equal to or less than N2 (e.g., 32), the random number that is added will have had its amplitude controlled in accordance with the following calculation:

"$p1=(RD-RD/SL)*(D-N1)/(N2-N1)+RD/SL$"

Similarly, if the input multilevel data D is equal to or greater than N3 (e.g., 201) and less than N4 (e.g., 233), the random number that is added will have had its amplitude controlled in accordance with the following calculation through processing similar to that described above:

"$p1=(RD-RD/SL)*(N4-D)/(N4-N3)+RD/SL$"

If the input multilevel data D is equal to or greater than N4, then only the minimum necessary random number is added in accordance with the calculation "$p1=RD/SL$"

Furthermore, if the input multilevel data D is outside the above-mentioned range, all random numbers RD are output from the addition-quantity controller 313 as the random number P1.

By virtue of the arrangement described above, binarization processing is executed by the binarization circuit 207 and the binarized data is printed out by the printhead 209 via the selector 208.

In accordance with the embodiment set forth above, dot-connectivity parameters of a binarization circuit can be changed and the connectivity parameters are corrected to optimum values for dealing with variations in dot reproducibility ascribable to differences in engine characteristics from one printer to another. This makes it possible to achieve stable reproduction of dots even in the case of printers connected via network. The end result is improved printing quality.

Second Embodiment

A second embodiment of the present invention will now be described with reference to the drawings.

Figure 22:
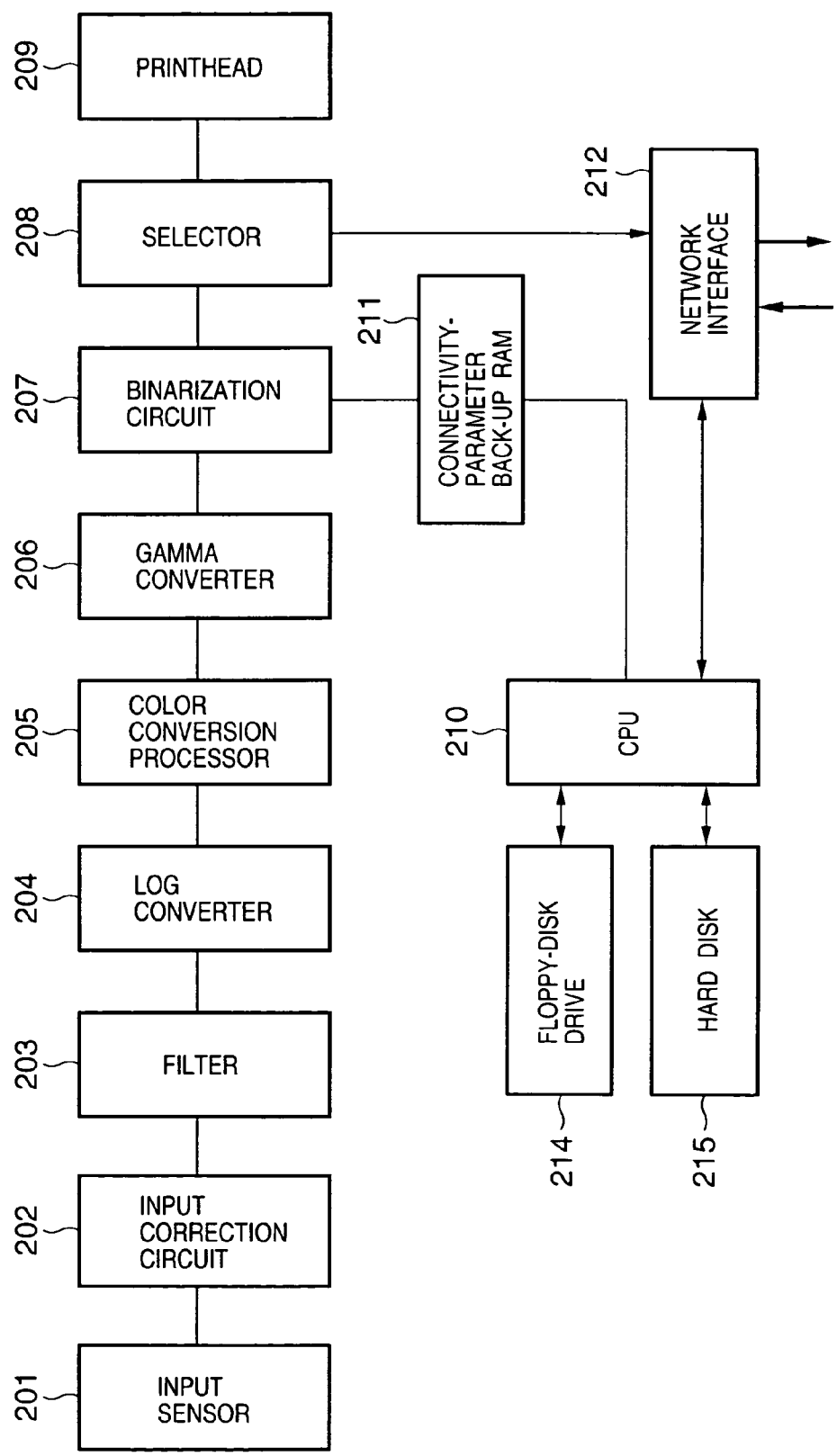
FIG. 22 is a block diagram illustrating the construction of an image processing section according to a second embodiment of the present invention.

FIG. 22 is a block diagram illustrating the construction of an image processing section according to a second embodiment of the present invention. As shown in FIG. 22, this embodiment differs from the first embodiment of FIG. 2 in that the correlation table 213 of the first embodiment is replaced by a floppy-disk drive 214 and hard disk 215. According to this arrangement, characteristic information concerning each printer can be obtained from a medium such as a floppy disk rather than being stored in advance as in the first embodiment.

With this arrangement, information similar to a PPD file that notifies this apparatus of the characteristics of each printer is provided via a medium such as a floppy disk. The floppy-disk drive 214 reads this information and stored in on the hard disk 215 via the CU 210.

In accordance with the second embodiment, data that has been stored on the hard disk 215 performs a function the same as that of the correlation table.

Third Embodiment

A third embodiment of the present invention will now be described with reference to the drawings.

The third embodiment uses a reader to read a change in dot reproducibility caused by a change in environment or a change with time of each printer on a network over which binary data is exchanged, and corrects dot-connectivity parameters in binarization in order to deal with dot connectivity that has changed, thereby optimizing dot connectivity to make possible stable reproduction of dots and provide a network printer environment in which high-quality printing is obtained at low cost.

Examples of a change in environment are a change in temperature and humidity brought about a change of location at which the device is installed. An example of a change with time is a change in the film thickness of a drum that accompanies an increase in number of copies printed.

Figure 23:
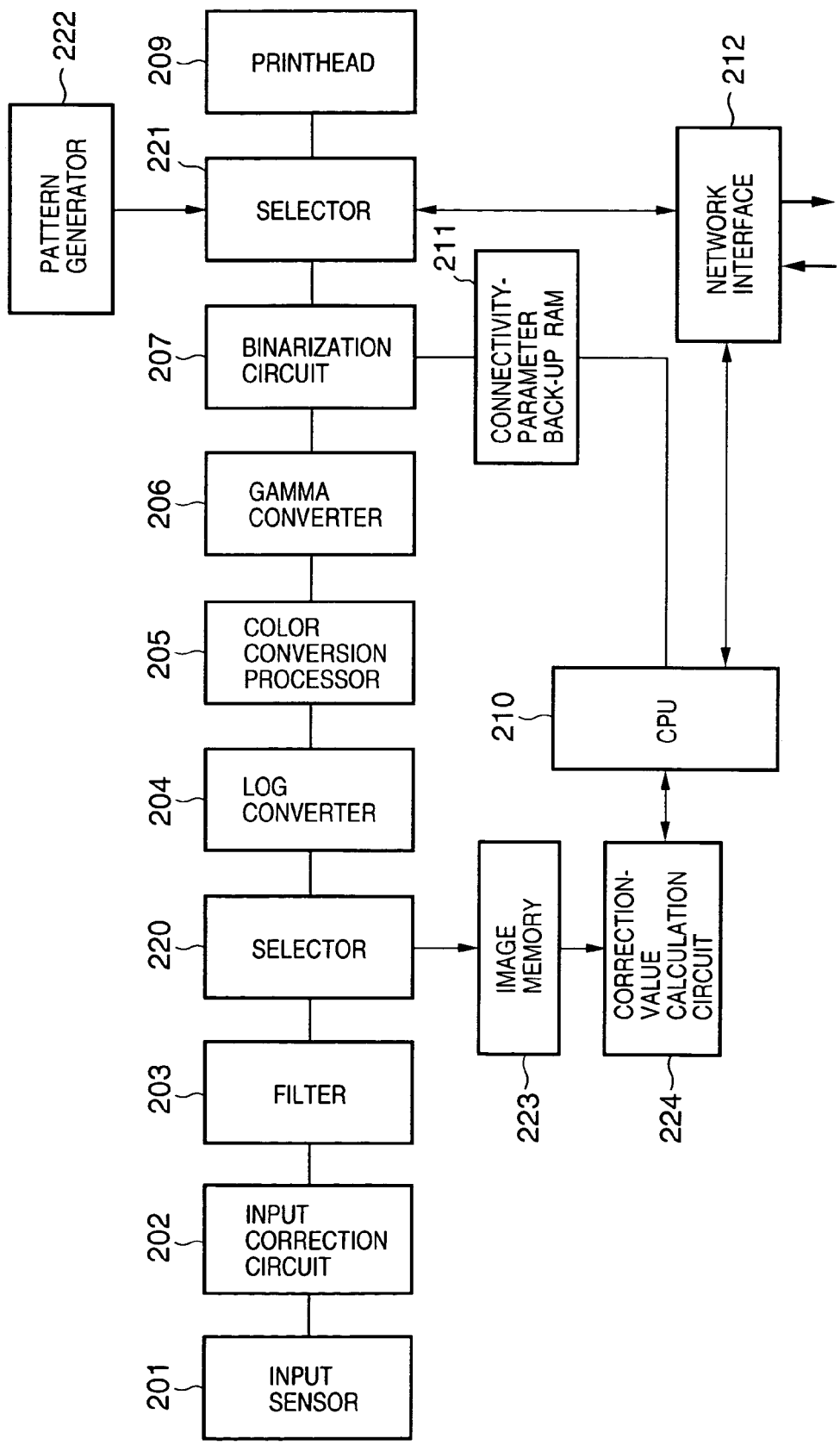
FIG. 23 is a block diagram illustrating the construction of an image processing section according to a third embodiment of the present invention.

FIG. 23 is a block diagram illustrating the construction of an image processing section according to the third embodiment of the present invention. Components in FIG. 23 having functions identical with those of the first embodiment in FIG. 2 are designated by like reference characters and need not be described again.

The arrangement of FIG. 23 includes a selector 220 for selecting an image memory (described later) as an output destination of image data in a case where a change in dot connectivity due to a change in the environment of a printer or a change with time is read; a selector 221 for selecting whether to print binarized image data as is or send the data to a network, and for selecting whether the destination of an input is the binarization circuit 207 or a pattern generator 222; the pattern generator 222 for generating a test pattern composed of several tone patches in which the connectivity parameters have been changed; an image memory 223 for storing read image data from the selector 220; and a correction-value calculation circuit 224 for calculating optimum connectivity parameters from the image data that has been stored in the image memory 223.

This arrangement will be described in regard to a case where connectivity parameters of the printing apparatus itself are calculated when connectivity parameters are set.

First, the pattern generator 222 generates a test-pattern signal. This signal is input as an image signal by the selector 221 and enters the printhead 209, which proceeds to perform printing based upon this binary pattern data. When printing of the test-pattern signal ends, the paper ejected from the printer is placed upon the document glass 152 and is read in. Data that has entered from the input sensor 201 passes through the input correction circuit 202 and filter 203 (unnecessary processing such as filtering is not applied) and is stored in the image memory 223 by the selector 220. Connectivity is calculated by the correction-value calculation circuit 224 from the stored image data. Here tone patches are cut from the image data and it is determined which of several patches have a density level equivalent to highlight density. Connectivity parameters are calculated from the densities of these patches.

Correction when a connection is made through a network will be described next.

First, the network interface 212 establishes communication with a printer at the printing destination. This printer uses its CPU to extract connectivity parameters from the connectivity-parameter back-up RAM and sends this information to this side (the sending side) via network communication means. The CPU 210 stores the sent connectivity parameters in the back-up RAM 211 for connectivity parameters. The printer at the destination rewrites the connectivity parameters in its back-up RAM periodically in order to deal with a change in the environment of the printer and a change with time. As mentioned earlier, rewriting of the connectivity parameters is carried out by reading a test pattern.

Next, the binarization circuit 207 binarizes the image signal based upon the connectivity parameters sent from the destination printer and stored in the back-up RAM 211. The binarized image signal is sent from the selector 221 to the printer at the destination (the receiving side) via the network interface 212. The printer at the destination performs printing based upon this binary image data.

Thus, there is provided means which, through use of a function that corrects (calibrates) a change in connectivity parameters due to a change in environment or a change with time on a per-device basis, is capable of transmitting connectivity parameters that have been corrected. This makes it possible to generate and send binary image data that assures stable dot reproduction by the destination printer even in a network environment in which only binary image data can be communicated.

Fourth Embodiment

A fourth embodiment of the present invention will now be described with reference to the drawings.

The fourth embodiment adds a memory 225, in which a number of connectivity parameters are stored in advance, to the arrangement of the third embodiment illustrated in FIG. 23.

Figure 24:
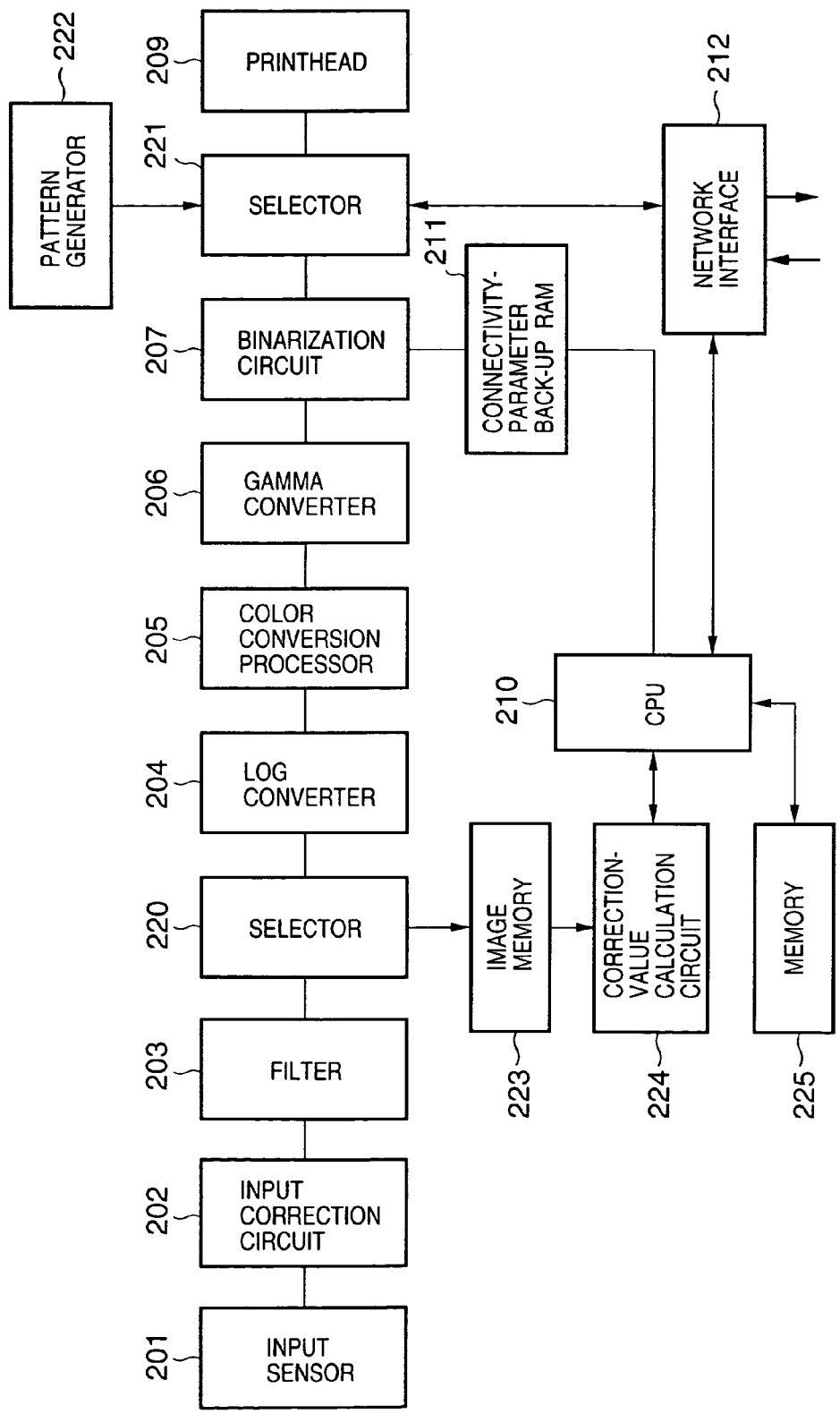
FIG. 24 is a block diagram illustrating the construction of an image processing section according to a fourth embodiment of the present invention.

FIG. 24 is a block diagram illustrating the construction of an image processing section according to the fourth embodiment. As shown in FIG. 24, all connectivity parameters of a number of printers connected to a network can be stored beforehand in the memory 225 instead of receiving connectivity parameters from another party when an output is to be produced.

The fourth embodiment is capable of dealing with a case where an output is made to a printer that does not have a reader or that cannot calculate connectivity parameters on its own. In such cases it is necessary to correct connectivity parameters through the network.

The pattern generator 222 generates a test-pattern signal. This signal is input as an image signal by the selector 221 and enters the network interface 212. The latter sends this binary pattern data to the printer on at the destination (on the receiving side), which proceeds to print out the pattern data. The sheet of paper on which the pattern data has been printed is read by the reader of the printing apparatus on this side (the sending side). That is, the paper ejected from the printer at the destination is placed on the document glass 152 of the printing apparatus on this side and is read in.

Next, image data that has entered from the input sensor 201 passes through the input correction circuit 202 and filter 203 (unnecessary processing such as filtering is not applied) and is stored in the image memory 223 by the selector 220. Connectivity is calculated by the correction-value calculation circuit 224 from the stored image data. The calculated connectivity parameters are stored in the memory 225. Connectivity parameters of a variety of printers are thus stored in the memory 225. When data is actually output to the destination printer via the network, the connectivity parameters of the applicable printer that have been stored in memory 225 are stored in the back-up RAM 211, the binarization circuit 207 performs binarization based upon these connectivity parameters and sends the binarized image data to the printer at the destination via the network interface 212.

By adopting this arrangement, stable dot reproduction can be assured even at a printer that cannot calculate connectivity parameters itself or that does not possess a reader.

Thus, in accordance with the third and fourth embodiments, dot-connectivity parameters of a binarization circuit can be changed, a change in dot reproducibility caused by a change in environment or a change with time is read by a reader, the connectivity parameters are optimized for dealing with this change in dot reproducibility and a correction is carried out for each printer. This makes possible the stable reproduction of dots, even in a case where printing is performed over a network, at printers having different dot reproducibilities caused by a change in process conditions due to environmental change or by disparities in engine characteristics. Printing quality can be improved as a result.

According to the third and fourth embodiments, changes in the environment and change with time are dealt with by printing a test-pattern signal, reading the printout and changing the connectivity parameters. However, sensors for sensing temperature and humidity or a sensor for sensing drum film thickness may be provided and the connectivity parameters can be changed in conformity with outputs from these sensors.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the present invention, as described above, the connectivity of a binary image is controlled to deal with a change in binary-image reproducibility caused by differences in the characteristics of image output devices on a network and by changes in the environment and change with time, thereby making it possible to optimize connectivity, achieve stable reproduction and improve image quality.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus that transmits, via a network, binary image data to an external image recording device, which records an image based on the binary image data, said apparatus comprising:

input means for inputting, pixel by pixel, multilevel image data containing gray-scale information;

binarization means for binarizing the multilevel image data by using a dot connectivity parameter which is variably controllable to control dot connectivity in a binary image;

communication means for communicating with the external image recording device via the network;

characteristic-information acquisition means for acquiring, by said communication means, characteristic-information concerning dot reproducibility from the external image recording device, wherein the characteristic-information differs according to a type of the external image recording device;

determination means for determining the dot connectivity parameter to be used by the binarization means in accordance with the characteristic-information acquired by said characteristic-information acquisition means; and transmitting means for transmitting image data binarized by said binarization means to the external image recording device, wherein said binarization means binarizes the multilevel image data using the dot connectivity parameter determined by the determination means, and said transmitting means transmits the image data binarized by said binarization means to the external image recording device from which the characteristic-information is acquired.

2. The apparatus according to claim 1, further comprising correlation storing means for storing a correlation between the dot connectivity parameter and the characteristic-information of the external image recording device.

3. The apparatus according to claim 1, further comprising dot connectivity parameter storing means for storing the dot connectivity parameter determined by said determination means, wherein said binarization means binarizes the multilevel image data by using the dot connectivity parameter stored in said dot connectivity parameter storing means.

4. The apparatus according to claim 1, wherein said determination means calculates a dot connectivity parameter which is suitable for the external image recording device based on the acquired characteristic-information.

5. A method for an image processing apparatus that transmits, via a network, binary image data to an external image recording device, which records an image based on the binary image data, the method comprising:

an input step of inputting, pixel by pixel, multilevel image data containing gray-scale information;

a binarization step of binarizing the multilevel image data by using a dot connectivity parameter which is variably controllable to control dot connectivity in a binary image;

a communication step of communicating with the external image recording device via the network;

a characteristic-information acquisition step of acquiring, by the communication stop, characteristic-information concerning dot reproducibility from the external image recording device, wherein the characteristic-information differs according to a type of the external image recording device;

a determination step of determining the dot connectivity parameter to be used in said binarization step in accordance with the characteristic-information acquired in said characteristic-information acquisition step; and a transmitting step of transmitting image data binarized in said binarization step to the external image recording device, wherein the binarization step binarizes the multilevel image data by using the dot connectivity parameter determined in said determination step, and the transmitting step transmits the image data binarized in said binarization step to the external image recording device which characteristic-information is acquired.

6. The method according to claim 5, further comprising a correlation storing step of storing a correlation between the dot connectivity parameter and the characteristic-information of the external image recording device.

7. The method according to claim 5, further comprising a dot connectivity parameter storing step of storing the dot connectivity parameter determined by the determination step, wherein the binarization step binarizes the multilevel image data by using the stored dot connectivity parameter.

8. The method according to claim 5, wherein the determination step calculates a dot connectivity parameter that is suitable for the external image output recording device, which communicates via the network, based on the acquired characteristic-information.

* * * * *

UNITED STATES PATENT AND TRADEMARK OFFICE
CERTIFICATE OF CORRECTION

PATENT NO. : 7,110,128 B1 Page 1 of 1
APPLICATION NO. : 09/678297
DATED : September 19, 2006
INVENTOR(S) : Hiroshi Kaburagi et al.

It is certified that error appears in the above-identified patent and that said Letters Patent is hereby corrected as shown below:

DRAWINGS:
Sheet 3, Figure 3, "BINARIZETION" (three occurrences) should read
-- BINARIZATION --.

COLUMN 4:
Line 50, "A" should read -- a --.

COLUMN 8:
Line 3, "– $LR1_{)]}/256$" should read -- – $LR1)]\}/256$ --.

COLUMN 9:
Line 1, "vales" should read -- values --; and
Line 53, "illustrates)" should read -- illustrated) --.

COLUMN 12:
Line 25, "vales" should read -- values --.

COLUMN 14:
Line 18, "stored in" should read -- stores it --.

COLUMN 16:
Line 2, "on at the destination" should read -- at the destination --.

COLUMN 18:
Line 47, "which" should read -- from which --.

Signed and Sealed this

Twenty-sixth Day of June, 2007

JON W. DUDAS
*Director of the United States Patent and Trademark Office*